US008577151B2

(12) United States Patent
Hu

(10) Patent No.: US 8,577,151 B2
(45) Date of Patent: Nov. 5, 2013

(54) METHOD, APPARATUS, AND PROGRAM FOR DETECTING OBJECT

(75) Inventor: Yi Hu, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 606 days.

(21) Appl. No.: 12/921,502

(22) PCT Filed: Apr. 1, 2009

(86) PCT No.: PCT/JP2009/057151
§ 371 (c)(1),
(2), (4) Date: Sep. 8, 2010

(87) PCT Pub. No.: WO2009/123354
PCT Pub. Date: Oct. 8, 2009

(65) Prior Publication Data
US 2011/0019920 A1 Jan. 27, 2011

(30) Foreign Application Priority Data
Apr. 4, 2008 (JP) ................................. 2008-098601

(51) Int. Cl.
*G06K 9/00* (2006.01)
(52) U.S. Cl.
USPC ............................ 382/195; 382/118; 382/117
(58) Field of Classification Search
None
See application file for complete search history.

(56) References Cited

U.S. PATENT DOCUMENTS

| 7,450,737 | B2 | 11/2008 | Ishikawa et al. | |
|---|---|---|---|---|
| 7,596,242 | B2 * | 9/2009 | Breed et al. | 382/103 |
| 7,720,285 | B2 | 5/2010 | Ishikawa et al. | |
| 2007/0160293 | A1 | 7/2007 | Ishikawa et al. | |
| 2007/0280540 | A1 | 12/2007 | Ikeda | |
| 2009/0022398 | A1 | 1/2009 | Ishikawa et al. | |

FOREIGN PATENT DOCUMENTS

| JP | 2004-295776 A | 10/2004 |
|---|---|---|
| JP | 2005-25568 A | 1/2005 |
| JP | 2005-92451 A | 4/2005 |
| JP | 2006-318341 A | 11/2006 |
| JP | 2007-164720 A | 6/2007 |
| JP | 2007-323572 A | 12/2007 |

OTHER PUBLICATIONS

Viloa[2], "Detecting Pedestrians Using Patterns of Motion and Appearance", published Aug. 2003.*
Viloa[1], "Rapid Object Detection using a Boosted Cascade of Simple Features", published 2001.*

(Continued)

*Primary Examiner* — David Zarka
*Assistant Examiner* — Ha Le
(74) *Attorney, Agent, or Firm* — Birch, Stewart, Kolasch & Birch, LLP.

(57) ABSTRACT

A region where a detecting target object exists is extracted by a comparison between an evaluated value indicating a probability that the detecting target object exists and a threshold, through the process of producing a differential image between different frames in plural frames constituting a continuous image, of setting an average value in an averaging region extended around each pixel of the differential image as a new value of each pixel, of obtaining the evaluated value by applying a filter that acts on a search region on an image to a search region extended around a search pixel that is extracted by comparing the new value and the threshold, on the differential image.

15 Claims, 20 Drawing Sheets

(56) References Cited

OTHER PUBLICATIONS

Kenji Baba et al., "Pedestrian Traffic Measurement System Using Computer Vision", Toshiba Review, vol. 61, No. 12, 2006, pp. 35-38.
Markopoulos et al., "Design of a Hybrid Object Detetion Scheme for Video Sequences", Advanced Concepts for Intelligent Vision Systems Lecture Notes in Computer Science, Jan. 1, 2005, pp. 252-259, XP019019678.
Viola et al., "Detecting Pedestrians Using Patterns of Motion and Appearance", Proceedings of the 9th IEEE Intl. Conf. on Computer Vision (ICCV), Oct. 13-16, 2003, pp. 734-741, XP010662435.
Yuk et al., "Real-Time Multiple Head Shape Detection and Tracking System with Decentralized Trackers", Oct. 16, 2006, pp. 1-6.

* cited by examiner

FIG. 15

TEACHER IMAGE a0    1.0 → 1.0*x → ...
TEACHER IMAGE b0    1.0 → 1.0*z → ...
TEACHER IMAGE c0    1.0 → 1.0*z → ...
    ...             ...
TEACHER IMAGE m0    1.0 → 1.0*y → ...

THE MARK * INDICATES AN OPERATION FOR CHANGING WEIGHTING

FIG. 16

| | (SECONDARY EVALUATED VALUE) | | (WEIGHT) |
|---|---|---|---|
| TEACHER IMAGE a0 | A | TEACHER IMAGE a1 | 1.0 * A |
| TEACHER IMAGE b0 | B | TEACHER IMAGE b1 | 1.0 * B |
| TEACHER IMAGE c0 | C | TEACHER IMAGE c1 | 1.0 * C |
| ... | ... | ... | ... |
| TEACHER IMAGE m0 | M | TEACHER IMAGE m1 | 1.0 * M |
| ... | ... | ... | ... |

THE MARK * INDICATES AN OPERATION FOR CHANGING WEIGHTING

METHOD, APPARATUS, AND PROGRAM FOR DETECTING OBJECT

TECHNICAL FIELD

The present invention relates to an object detecting method and an object detecting apparatus for detecting a specific kind of object from a continuous image including plural frames each of which is expressed by two-dimensionally arrayed pixels and a non-transitory computer-readable storage medium storing an object detecting program that causes an operation device executing the program to work as the object detecting apparatus.

BACKGROUND ART

For example, a human head appears on images in various sizes and various shapes. Although a person can instantaneously and easily distinguish a human head from other items when seeing the human head with eyes, it is very difficult for a device to automatically distinguish the human head from other items. On the other hand, it is considered that the detection of a human head on images is important preprocessing and a fundamental technique in person detection. Particularly, in video image monitoring, there is a growing need for putting a technique capable of accurately detecting the human head to practical use as preprocessing of automatic and accurate person detection, person tracking, and measurement of a flow of people in various environments.

Regarding methods of detecting a human head, conventionally various methods are proposed (Patent Documents 1-4, and a Non-Patent Document 1). In these proposed detection methods, a circle or an ellipse is applied to a human head by various techniques on the assumption that the human head is basically circular or elliptic.

For example, the Patent Document 1 discloses a technique in which an ellipse is extracted by performing Hough transform vote to a brightness edge hierarchy image group produced from continuous two frame images by temporal difference and spatial difference, thereby detecting a person's head.

The Patent Document 2 discloses a technique in which a spatial distance image is produced from the video images taken by at least two cameras, an object is determined by dividing a region of the produced spatial distance image using a labeling technique, and circle fitting is applied to the determined object to obtain a person's head.

The Patent Document 3 discloses a technique in which the comparison is performed with not a simple ellipse template but a pattern (a part of the ellipse) as a reference pattern when the determination of the head is made, the pattern being obtained by decreasing intensity near a contact point with a tangential line perpendicular to an edge direction of an edge image.

The Patent Document 4 discloses a technique in which a head region that is a part of a foreground is estimated by computing a moment or a barycenter in a foreground region of a person extracted from an input image, and the ellipse applied to the person's head is determined based on a shape of the region.

In the Non-Patent Document 1, a technique is disclosed, in which a semicircle is found to seek a head candidate using the Hough transform, a profile probability of each point on a profile line is computed from the head candidate to determine whether or not the head candidate is a head.

In these techniques, a circle or an ellipse is searched from the image on the assumption that a person's head is basically the circle or the ellipse. However, basically it takes a long time to search the circle or the ellipse in the whole image region, and it is difficult to analyze multiple sequentially-transmitted images such as a video image in real time.

There has been proposed another technique in which a differential image is produced with a continuous image such as the video image to catch a human moving on the continuous image (See Patent Documents 5, 6).

FIG. 1 is an explanatory view of a method that produces a differential image from background images.

Part (A) of FIG. 1 shows a technique in which a differential image between two images of different frames, for example, an immediately preceding frame and a present frame are produced using a moving image including plural continuous frames and a moving object (for example, human) emerging on the differential image between the two frame images is extracted.

Part (B) of FIG. 1 shows a technique in which an average background image is produced from the plural frame images and a differential image between the average background image and the present frame image is produced to extract the moving object emerging on the differential image.

In the differential image producing techniques of FIG. 1, the whole outline of the human does not purely come to the differential image, but sometimes small parts of the human separately emerges on the differential image or sometimes the background except the human also partially emerges on the differential image due to a change of illumination. Therefore, there is a need for such an analysis and integration operation that the outline of the human is estimated while some patterns emerging on the differential image are combined or deleted. The moving object cannot be extracted unless the analysis and integration operation is accurately performed. On the other hand, when the analysis and integration operation is accurately performed, a long time is required, which results in difficulty of real-time analysis.

Patent Document 1: Japanese Patent Application Laid-Open No. 2004-295776
Patent Document 2: Japanese Patent Application Laid-Open No. 2005-92451
Patent Document 3: Japanese Patent Application Laid-Open No. 2005-25568
Patent Document 4: Japanese Patent Application Laid-Open No. 2007-164720
Patent Document 5: Japanese Patent Application Laid-Open No. 2007-323572
Patent Document 6: Japanese Patent Application Laid-Open No. 2006-318341
Non-Patent Document 1: "Real-time multiple head shape detection and tracking system with decentralized trackers", ISDA, 2006, by Jacky. S. C. Yuk, Kwan-Yee K. Wong, Ronald H. Y. Chung, F. Y. L Chin, and K. P. Chow.

DISCLOSURE OF THE INVENTION

In view of the foregoing, an object of the invention is to provide an object detecting method and an object detecting apparatus that detects a detecting target object emerging on the image at high speed and a non-transitory computer-readable storage medium storing an object detecting program that causes an operation device executing the program to work as the object detecting apparatus detecting the object at high speed.

According to the present invention, an object detecting method that detects a specific kind of object from a continuous image including plural frames each of which is expressed by two-dimensionally arrayed pixels, includes:

a differential image producing step of producing a differential image between a first frame and a second frame in the plural frames constituting the continuous image, the first frame and the second frame being different from each other;

a search pixel extracting step of computing a differential value between new values of pixels corresponding to the first frame and the second frame, of comparing the differential value and a threshold, and of extracting a search pixel on the differential image, when an average value of values of plural pixels in an averaging region having a two-dimensional predetermined size around each pixel for each of the first frame and the second frame is set at a new value of each pixel, the search pixel searching existence of the specific kind of object; and an object detecting step of applying a filter to a search region including the search pixel extracted in the search pixel extracting step on the differential image produced in the differential image producing step, of obtaining an evaluated value with the filter, and of comparing the evaluated value and the threshold to extract a region where the specific kind of object exists, the filter acting on a search region having an area and a shape that are identical to those of the averaging region on the image, the filter obtaining the evaluated value indicating a probability that the specific kind of object exists in the search region.

Similarly to the Patent Document 5, the differential image between the two frames is used in the object detecting method of the invention. However, in addition to the differential image, the differential value of the new value of each pixel is computed to determine the search region on the differential image using the averaging region having the same size as the search region on which the specific kind of object detecting filter acts, so that only the region narrower than that of the case in which the whole region on the image is searched can be set at the search target to perform the high-speed detection.

Here, in the object detecting method according to the present invention, it is preferable that the differential image producing step is a step of producing a differential image between the first frame and the second frame and producing a differential image group from plural differential images by producing at least one differential image between a first thin-out frame and a second thin-out frame, the plural differential images having an identical scene and different resolutions, the first thin-out frame and the second thin-out frame having an identical size, the first thin-out frame and the second thin-out frame being formed by thinning out the pixels constituting each frame at a predetermined ratio for each of the first frame and the second frame or by gradually thinning out the pixels at the predetermined ratio; that the object detecting step is a step of detecting a specific kind of object from the differential images by sequentially repeating plural extraction processes from an extraction process of applying a filter acting on a relatively narrow search region to a relatively small differential image toward an extraction process of applying a filter acting on a relatively wide search region to a relatively differential large image, the plural extraction processes including a first extraction process and a second extraction process, in the first extraction process, a primary candidate region being extracted by applying a first filter to a first differential image that is relatively small in the differential image group produced in the differential image producing step, an evaluated value exceeding a predetermined first threshold being obtained in the primary candidate region, the first filter acting on a relatively narrow search region in a filter group including plural filters acting on plural search regions, having plural sizes, the number of pixels corresponding to the size of the region on the image being changed at the predetermined ratio or gradually changed at the predetermined ratio in the plural search regions having the plural sizes, the plural filters acting on the search region that is two-dimensionally extended on the image, the plural filters producing an evaluated value indicating a probability that the specific kind of object exists in the search region; that in the second extraction process, a secondary candidate region being extracted by applying a second filter to a region corresponding to the primary candidate region in a second differential image in which the number of pixels is larger by one stage than that of the first differential image in the differential image group produced in the differential image producing step, the evaluated value exceeding a predetermined second threshold being obtained in the secondary candidate region, the second filter acting on the search region that is wider by one stage than that of the first filter in the filter group; that the search pixel extracting step is a step of employing an averaging region having an area and a shape that are identical to those of a maximum search region to which a maximum region filter acting on the maximum search region in the filter group and of extracting the search pixel from the differential image to which the maximum region filter is applied in the object detecting step in the plural differential images constituting the differential image group produced in the differential image producing step; and that the object detecting step is a step of extracting the primary candidate region from the search region by applying the first filter to the search region on the first differential image in the first extraction process, the search region including the pixel corresponding to the search pixel extracted in the search pixel extracting step.

The plural filters that act on the plural search regions having gradually different sizes to detect the object are prepared. On the other hand, for the detecting target differential image, the differential image group including the differential images having plural sizes is produced by the thin-out, and the process of applying the filter to the differential image to extract the region sequentially proceeds from the process of applying the filter acting on the relatively narrow search region to the relatively small differential image toward the process of applying the filter acting on the relatively wide search region to the relatively large differential image. Additionally, in the latter process, the filter is applied only to the region extracted in the immediately-preceding process. Therefore, the speed enhancement can be realized.

At this point, in the first extraction process, the first filter does not search the whole region of the first differential image, but the search range is narrowed on the first differential image by extracting the search pixel from the differential image to which the maximum region filter is applied. Therefore, the speed enhancement can further be realized.

Further, in the object detecting method according to the present invention, it is also preferable that the differential image producing step is a step of producing the differential image group and of producing newly at least one differential image group, the at least one differential image group including one interpolated differential image or plural interpolated differential images and at least one thinned-out differential image, the one interpolated differential image being obtained by an interpolation operation, the one interpolated differential image having a range of the number of pixels that is smaller than the number of pixels of the maximum-area differential image constituting the differential image group and larger than the number of pixels of the thinned-out differential image obtained by thinning out the maximum-area differential image at the predetermined ratio, the number of pixels being changed within the range in the plural interpolated differential images, the at least one thinned-out differential image being formed by thinning out the pixels constituting interpolated differential image at the predetermined ratio for each of the interpolated differential images or formed by gradually thinning out the pixels at the predetermined ratio, and the object detecting step is a step of detecting the specific kind of object by sequentially repeating the plurality of extraction processes from the extraction process of applying the filter acting on the relatively narrow search region to the relatively small image toward the extraction process of applying the filter acting on the relatively wide search region to the relatively large image to each of the plural differential image groups produced in the differential image producing step.

Thus, the objects having various sizes can be detected when the plural image groups having the different sizes are produced and used to detect the object.

Furthermore, in the object detecting method according to the present invention, it is also preferable that plural kinds of filters are prepared for each search region having one size, each of the plural kinds of filters computing an outline of the specific kind of object and one of feature quantities in the specific kind of object, and a correspondence relationship between the feature quantity computed by each filter and the primary evaluated value indicating the probability of the specific kind of object is prepared, and the object detecting step is a step of computing the plural feature quantities by applying the plural kinds of filters to one search region according to the size of the search region, of obtaining each primary evaluated value corresponding to each feature quantity, of comparing a secondary evaluated value in which the plural primary evaluated values is integrated and a threshold, and of determining whether or not the search region is a candidate region where the specific kind of object exists.

Thus, when compared with the conventional extraction that is performed by the operation focused only on the outline shape, the extraction can be performed with high accuracy by the combination of the plural filters that extract the object outline and the feature quantities indicating various features in the object.

It is preferable that the object detecting method further includes a region integrating section of integrating plural regions into one region according to a degree of overlapping of the plural regions when the plural regions are detected in the object detecting step.

For example, when the human head is the detecting target, sometimes both a first region and a second region are extracted as the person's head region. The first region includes the person face in the substantial center of the image. The second region includes the head including the hair of the same person in the substantial center of the same image. In the second region, compared with the first region, the head partially overlaps another item while the head is separated from another item. Therefore, in such cases, the region integrating step is preferably performed to integrate the plural regions into one region according to a degree of overlapping of the plural region.

In the object detecting method according to the invention, the filter group may include plural filters that produce an evaluated value indicating a probability of existence of a human head, and the human head emerging in an image is set at a detecting target in the object detecting method.

The object detecting method of the invention is suitable to the case in which the human head is the detecting target. However, the object detecting method of the invention is not limited to the detection of the human head, but the object detecting method can be applied to various fields, such as the detection of the person face and the outdoor detection of the wild bird, in which the specific kind of object is detected.

According to the present invention, an object detecting apparatus that detects a specific kind of object from a continuous image including plural frames each of which is expressed by two-dimensionally arrayed pixels, includes:

a differential image producing section that produces a differential image between a first frame and a second frame in the plural frames constituting the continuous image, the first frame and the second frame being different from each other;

a search pixel extracting section that computes a differential value between new values of pixels corresponding to the first frame and the second frame, compares the differential value and a threshold, and extracts a search pixel on the differential image, when an average value of values of plural pixels in an averaging region having a two-dimensional predetermined size around each pixel for each of the first frame and the second frame is set at a new value of each pixel, the search pixel searching existence of the specific kind of object;

a filter storage section in which a filter is stored, the filter acting on a search region having an area and a shape that are identical to those of the averaging region on the image, the filter obtaining an evaluated value indicating a probability that the specific kind of object exists in the search region; and an object detecting section that applies a filter stored in the filter storage section to the search region including the search pixel extracted by the search pixel extracting section on the differential image produced by the differential image producing section, obtains the evaluated value with the filter, and compares the evaluated value and the threshold to extract a region where the specific kind of object exists.

Here, in the object detecting apparatus, it is preferable that the differential image producing section produces a differential image between the first frame and the second frame and produces a differential image group from plural differential images by producing at least one differential image between a first thin-out frame and a second thin-out frame, the plural differential images having an identical scene and different resolutions, the first thin-out frame and the second thin-out frame having an identical size, the first thin-out frame and the second thin-out frame being formed by thinning out the pixels constituting each frame at a predetermined ratio for each of the first frame and the second frame or by gradually thinning out the pixels at the predetermined ratio; that a filter group including plural filters is stored in the filter storage section, the plural filters acting on plural search regions having plural sizes, the number of pixels corresponding to the size of the region on the image being changed at the predetermined ratio or gradually changed at the predetermined ratio in the plural search regions having the plural sizes, the plural filters acting on the search region that is two-dimensionally extended on the image, the plural filters producing an evaluated value indicating a probability that the specific kind of object exists in the search region; that the object detecting section detects the specific kind of object from the differential images by sequentially repeating plural extraction processes from an extraction process of applying a filter acting on a relatively narrow search region to a relatively small differential image toward an extraction process of applying a filter acting on a relatively wide differential region to a relatively large search image, the plural extraction processes including a first extraction process and a second extraction process, in the first extraction process, a primary candidate region being extracted by applying a first filter to a first differential image that is relatively small in the differential image group produced in the differential image producing step, an evaluated value exceeding a predetermined first threshold being obtained in the primary candidate region, the first filter acting on a relatively narrow search region in a filter group stored in the filter storage section, in the second extraction process, a secondary candidate region being extracted by applying a second filter to a region corresponding to the primary candidate region in a second differential image in which the number of pixels is larger by one stage than that of the first differential image in the differential image group produced by the differential image producing section, the evaluated value exceeding a predetermined second threshold being obtained in the secondary candidate region, the second filter acting on the search region that is wider by one stage than that of the first filter in the filter group; that the search pixel extracting section employs an averaging region having an area and a shape that are identical to those of a maximum search region to which a maximum region filter of search regions having the plural sizes, the plural filters acting on the search region that is two-dimensionally extended on the image, the plural filters producing an evaluated value indicating a probability that the specific kind of object exists in the search region; and that the object detecting section detects the specific kind of object from the differential images by sequentially repeating plural extraction processes from an extraction process of applying a filter acting on a relatively narrow search region to a relatively small differential image toward an extraction process of applying a filter acting on a relatively wide differential region to a relatively large search image, the plural extraction processes including a first extraction process and a second extraction process, in the first extraction process, a primary candidate region being extracted by applying a first filter to a first differential image that is relatively small in the differential image group produced in the differential image producing step, an evaluated value exceeding a predetermined first threshold being obtained in the primary candidate region, the first filter acting on a relatively narrow search region in a filter group stored in the filter storage section, in the second extraction process, a secondary candidate region being extracted by applying a second filter to a region corresponding to the primary candidate region in a second differential image in which the number of pixels is larger by one stage than that of the first differential image in the differential image group produced by the differential image producing section, the evaluated value exceeding a predetermined second threshold being obtained in the secondary candidate region, the second filter acting on the search region that is wider by one stage than that of the first filter in the filter group; that the search pixel extracting section employs an averaging region having an area and a shape that are identical to those of a maximum search region to which a maximum region filter acting on the maximum search region in the filter group and extracts the search pixel from the differential image to which the maximum region filter is applied by the object detecting section in the plural differential images constituting the differential image group produced by the differential image producing section; and that the object detecting section extracts the primary candidate region from the search region by applying the first filter to the search region on the first differential image in the first extraction process, the search region including the pixel corresponding to the search pixel extracted by the search pixel extracting section.

Furthermore, in the object detecting apparatus, it is preferable that the differential image producing section produces the differential image group and newly at least one differential image group, the at least one differential image group including one interpolated differential image or plural interpolated differential images and at least one thinned-out differential image, the one interpolated differential image being obtained by an interpolation operation, the one interpolated differential image having a range of the number of pixels that is smaller than the number of pixels of the maximum-area differential image constituting the differential image group and larger than the number of pixels of the thinned-out differential image obtained by thinning out the maximum-area differential image at the predetermined ratio, the number of pixels being changed within the range in the plural interpolated differential images, the at least one thinned-out differential image being formed by thinning out the pixels constituting interpolated differential image at the predetermined ratio for each of the interpolated differential images or formed by gradually thinning out the pixels at the predetermined ratio; and that the object detecting section detects the specific kind of object by sequentially repeating the plurality of extraction processes from the extraction process of applying the filter acting on the relatively search narrow region to the relatively small image toward the extraction process of applying the filter acting on the relatively wide search region to the relatively large image to each of the plural differential image groups produced by the differential image producing section.

Still more, in the object detecting apparatus, it is preferable that plural kinds of filters for each search region having one size are stored in the filter storage section, each of the plural kinds of filters detecting an outline of the specific kind of object and one of feature quantities in the specific kind of object, and a correspondence relationship between the feature quantity computed by each filter and the primary evaluated value indicating a probability of the specific kind of object is stored in the filter storage section; and that the object detecting section computes the plural feature quantities by applying the plural kinds of filters to one search region according to the size of the search region, obtains each primary evaluated value corresponding to each feature quantity, compares a secondary evaluated value in which the plural primary evaluated values are integrated and a threshold, and determines whether or not the search region is a candidate region where the specific kind of object exists.

Preferably, the object detecting apparatus further includes a region integrating section that integrates plural regions into one region according to a degree of overlapping of the plural regions when the plural regions are detected by the object detecting section.

Here, it is preferable that the filter group including plural filters that produce an evaluated value indicating a probability of existence of a human head is stored in the filter storage section; and that the object detecting apparatus sets the human head emerging in an image at a detecting target.

According to the present invention, a non-transitory computer-readable storage medium storing an object detecting program that is executed in an operation device, the object detecting program causing the operation device to be operated as a object detecting apparatus that detects a specific kind of object from a continuous image including plural frames each of which is expressed by two-dimensionally arrayed pixels, the object detecting apparatus including:

a differential image producing section that produces a differential image between a first frame and a second frame in the plural frames constituting the continuous image, the first frame and the second frame being different from each other;

a search pixel extracting section that computes a differential value between new values of pixels corresponding to the first frame and the second frame, compares the differential value and a threshold, and extracts a search pixel on the differential image, when an average value of values of plural pixels in an averaging region having a two-dimensional predetermined size around each pixel for each of the first frame and the second frame is set at a new value of each pixel, the search pixel searching existence of the specific kind of object; a filter storage section in which a filter is stored, the filter acting on a search region having an area and a shape that are identical to those of the averaging region on the image, the first filter obtaining an evaluated value indicating a probability that the specific kind of object exists in the search region; and an object detecting section that applies a filter stored in the filter storage section to the search region including the search pixel extracted by the search pixel extracting section on the differential image produced by the differential image producing section, obtains the evaluated value with the filter, and compares the evaluated value and the threshold to extract a region where the specific kind of object exists. Here, in the non-transitory computer-readable storage medium, it is preferable that the differential image producing section produces a differential image between the first frame and the second frame and produces a differential image group from plural differential images by producing at least one differential image between a first thin-out frame and a second thin-out frame, the plural differential images having an identical scene and different resolutions, the first thin-out frame and the second thin-out frame having an identical size, the first thin-out frame and the second thin-out frame being formed by thinning out the pixels constituting each frame at a predetermined ratio for each of the first frame and the second frame or by gradually thinning out the pixels at the predetermined ratio; that the filter storage section stores a filter group including plural filters, the plural filters acting on plural search regions having plural sizes, the number of pixels corresponding to the size of the region on the image being changed at the predetermined ratio or gradually changed at the predetermined ratio in the plural search regions having the plural sizes, the plural filters acting on the search region that is two-dimensionally extended on the image, the plural filters producing an evaluated value indicating a probability that the specific kind of object exists in the search region; that the object detecting section detects the specific kind of object from the differential images by sequentially repeating plural extraction processes from an extraction process of applying a filter acting on a relatively narrow search region to a relatively small differential image toward an extraction process of applying a filter acting on a relatively wide search, in the first extraction process, a primary candidate region being extracted by applying a first filter to a first differential image that is relatively small in the differential image group produced in the differential image producing step, an evaluated value exceeding a predetermined first threshold being obtained in the primary candidate region, the first filter acting on a relatively narrow search region in a filter group stored in the filter storage section, in the second extraction process, a secondary candidate region being extracted by applying a second filter to a region corresponding to the primary candidate region in a second differential image in which the number of pixels is larger by one stage than that of the first differential image in the differential image group produced by the differential image producing section, the evaluated value exceeding a predetermined second threshold being obtained in the secondary candidate region, the second filter acting on the search region that is wider by one stage than that of the first filter in the filter group; that the search pixel extracting section employs an averaging region having an area and a shape that are identical to those of a maximum search region to which a maximum region filter acting on the maximum search region in the filter group and extracts the search pixel from the differential image to which the maximum region filter is applied by the object detecting section in the plural differential images constituting the differential image group produced by the differential image producing section; and that the object detecting section extracts the primary candidate region from the search region by applying the first filter to the search region on the first differential image in the first extraction process, the search region including the pixel corresponding to the search pixel extracted by the search pixel extracting section.

In addition, in the non-transitory computer-readable storage medium according to the invention, it is preferable that the differential image producing section produces the differential image group and newly at least one differential image group, the at least one differential image group including one interpolated differential image or plural interpolated differential images and at least one thinned-out differential image, the one interpolated differential image being obtained by an interpolation operation, the one interpolated differential image having a range of the number of pixels that is smaller than the number of pixels of the maximum-area differential image constituting the differential image group and larger than the number of pixels of the thinned-out differential image obtained by thinning out the maximum-area differential image at the predetermined ratio, the number of pixels being changed within the range in the plural interpolated differential images, the at least one thinned-out differential image being formed by thinning out the pixels constituting interpolated differential image at the predetermined ratio for each of the interpolated differential images or formed by gradually thinning out the pixels at the predetermined ratio; and that the object detecting section detects the specific kind of object by sequentially repeating the plurality of extraction processes from the extraction process of applying the filter acting on the relatively narrow search region to the relatively small image toward the extraction process of applying the filter acting on the relatively wide search region to the relatively large image to each of the plural differential image groups produced by the differential image producing section.

Additionally, in the non-transitory computer-readable storage medium according to the invention, it is preferable that plural kinds of filters for each search region having one size are stored in the filter storage section, each of the plural kinds of filters detecting an outline of feature quantities of and one of feature quantities in the specific kind of object, and a correspondence relationship between the feature quantity computed by each filter and the primary evaluated value indicating a probability of the specific kind of object is stored in the filter storage section; and that the object detecting section computes the plural feature quantities by applying the plural kinds of filters to one search region according to the size of the search region, obtains each primary evaluated value corresponding to each feature quantity, compares a secondary evaluated value in which the plural primary evaluated values are integrated and a threshold, and determines whether or not the search region is a candidate region where the specific kind of object exists.

Besides, in the non-transitory computer-readable storage medium according to the invention, it is preferable that the operation device is operated as the object detecting apparatus further including a region integrating section that integrates plural regions into one region according to a degree of overlapping of the plural regions when the plural regions are detected by the object detecting section.

Here, in the non-transitory computer-readable storage medium according to the invention, it is preferable that the filter group including plural filters that produce an evaluated value indicating a probability of existence of a human head is stored in the filter storage section; and that the object detecting program causes the operation device to be operated as the object detecting apparatus that sets the human head emerging in an image at a detecting target.

Accordingly, the search region is narrowed to detect the specific kind of object on the differential image, and the object can be detected at high speed.

BRIEF DESCRIPTION OF THE DRAWINGS

FIG. 15 is an explanatory view showing weighting of the teacher image.

FIG. 16 is an explanatory view showing a weighting method in making a transition to learning of a 16-by-16-pixel filter after an 8-by-8-pixel filter is extracted.

BEST MODE FOR CARRYING OUT THE INVENTION

Embodiments of the invention will be described below with reference to the drawings.

Figure 2:
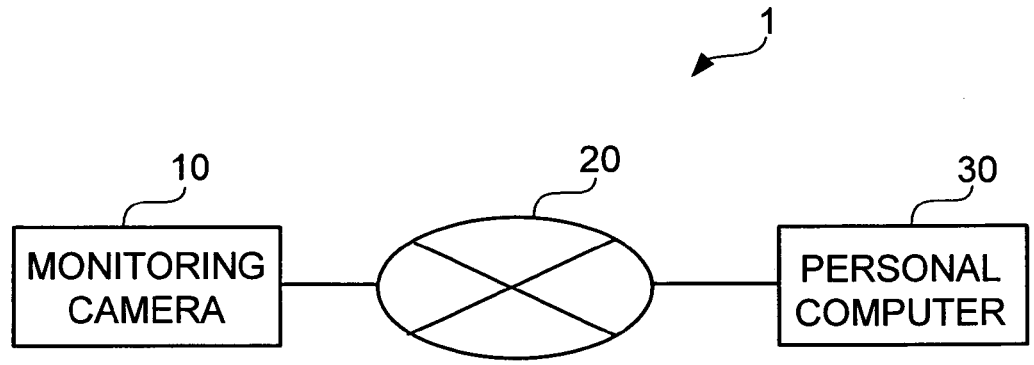
FIG. 2 is a schematic diagram showing a monitoring camera system into which an embodiment of the invention is incorporated.

FIG. 2 is a schematic diagram showing a monitoring camera system into which an embodiment of the invention is incorporated.

Referring to FIG. 2, a monitoring camera system 1 includes a monitoring camera 10, an Internet 20, and a personal computer 30. The personal computer 30 is operated as a head detecting apparatus that is an object detecting apparatus according to an embodiment of the invention.

For example, the monitoring camera 10 is placed in a bank to take a picture of appearances inside the bank. The monitoring camera 10 is connected to the Internet 20, and the monitoring camera 10 transmits image data expressing a moving image to the personal computer 30 through network communication. Hereinafter the image on the data is simply referred to as "image".

The personal computer 30 is connected to the Internet 20, and the personal computer 30 receives the moving image transmitted from the monitoring camera 10 through the network communication. The personal computer 30 collectively manages the moving images taken by the monitoring camera 10.

Figure 3:
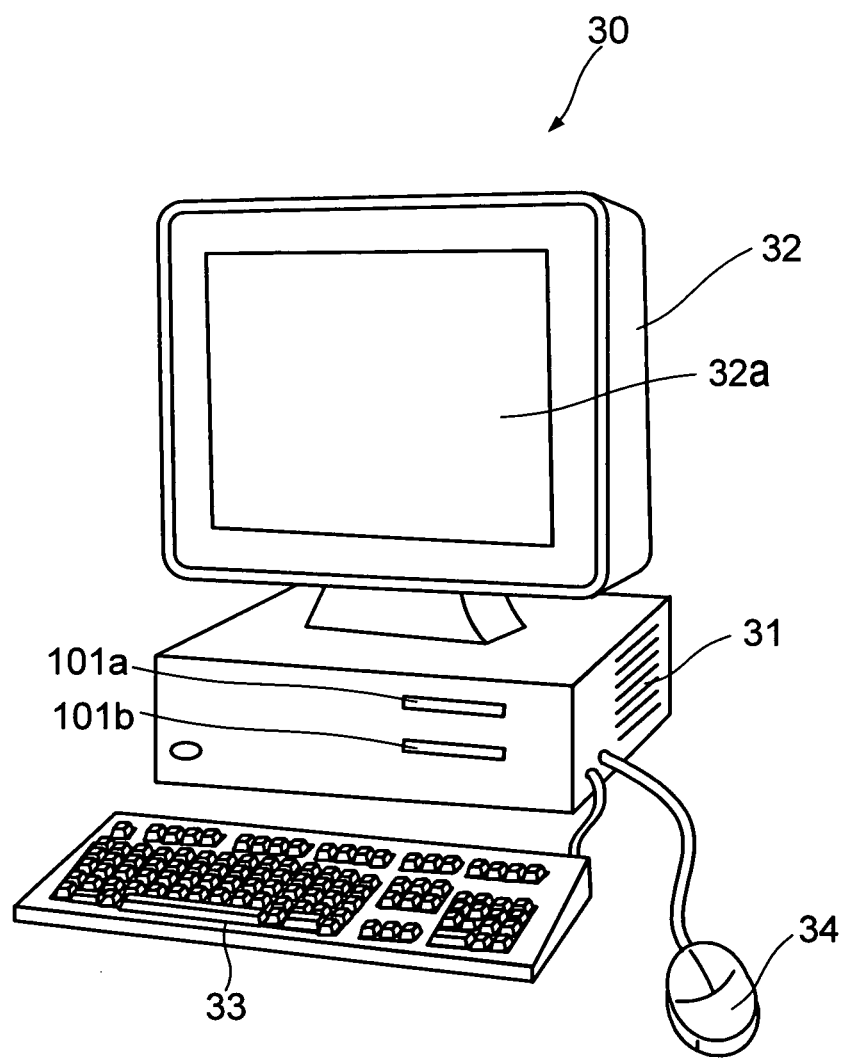
FIG. 3 is a perspective view showing an appearance of a personal computer expressed by one block in FIG. 2.

The detailed description of the monitoring camera 10 is omitted because the monitoring camera 10 is not the main subject of the invention, and the personal computer 30 that is operated as the head detecting apparatus of the embodiment of the invention will be described below. FIG. 3 is a perspective view showing an appearance of the personal computer 30 shown by one block of FIG. 2, and FIG. 4 shows a hardware configuration of the personal computer 30.

The head detecting apparatus as the embodiment of the invention is formed by the hardware and OS (Operating System) of the personal computer 30 and a head detecting program which is installed in and executed by the personal computer 30.

Outwardly, the personal computer 30 is equipped with a main body 31, an image display device 32, a keyboard 33, and a mouse 34. The image display device 32 displays images on a display screen 32a according to an instruction provided from the main body 31. The keyboard 33 feeds various pieces of information into the main body 31 according to a key manipulation. The mouse 34 specifies an arbitrary position on the display screen 32a to feed an instruction corresponding to an icon displayed at the position at that time. From the appearance, the main body 31 includes a MO loading port 31a through which a magneto-optical disk (MO) is loaded and a CD/DVD loading port 31b through which CD or DVD is loaded.

Figure 4:
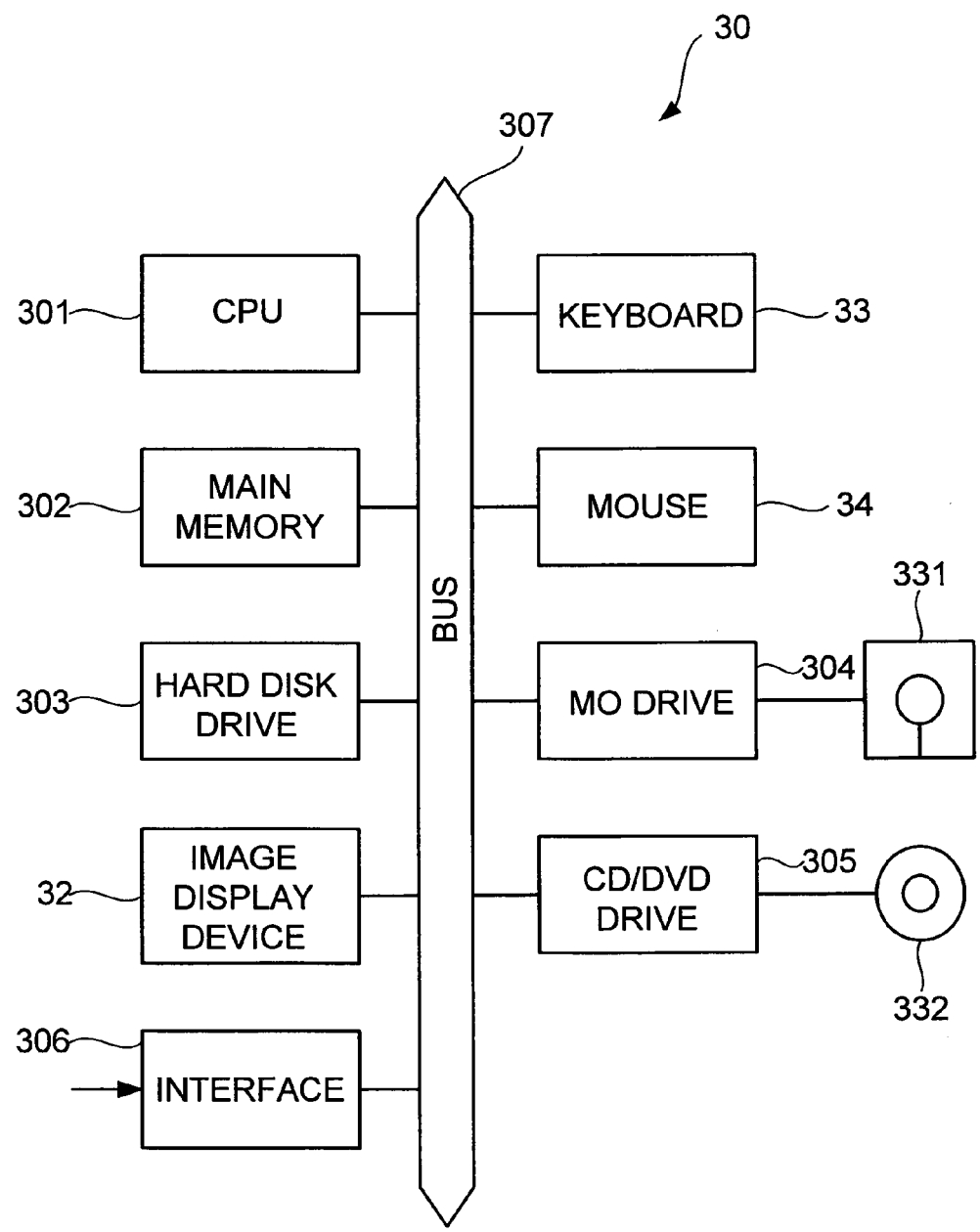
FIG. 4 shows a hardware configuration of the personal computer.

As shown in FIG. 4, the main body 31 includes a CPU 301, a main memory 302, a hard disk drive 303, an MO drive 304, a CD/DVD drive 305, and an interface 306. The CPU 301 executes various programs. In the main memory 302, a program stored in the hard disk drive 303 is read and expanded to be executed in the CPU 301. The various programs and pieces of data are stored in the hard disk drive 303. The MO 331 is loaded in the MO drive 304, and the MO drive 304 accesses the loaded MO 331. A CD or DVD (in this cases, CD and DVD are referred to as CD/DVD while not distinguished from each other) is loaded in the CD/DVD drive 305, and the CD/DVD drive 305 accesses the CD/DVD 332. The interface 306 is connected to the Internet 20 of FIG. 2 to receive the image data taken by the monitoring camera 10. The components of FIG. 4 and the image display device 32, keyboard 33, and mouse 34 of FIG. 3 are connected through a bus 307.

A head detecting program is stored in the CD/DVD 332 to operate the personal computer as the head detecting apparatus. The CD/DVD 332 is loaded in the CD/DVD drive 305, and the head detecting program stored in the CD/DVD 332 is uploaded in the personal computer 30 and stored in the hard disk drive 303. The head detecting program stored in the hard disk drive 303 is read from the hard disk drive 303, and the head detecting program is expanded on the main memory 302 and executed by the CPU 301, thereby operating the personal computer 30 as the head detecting apparatus.

Figure 5:
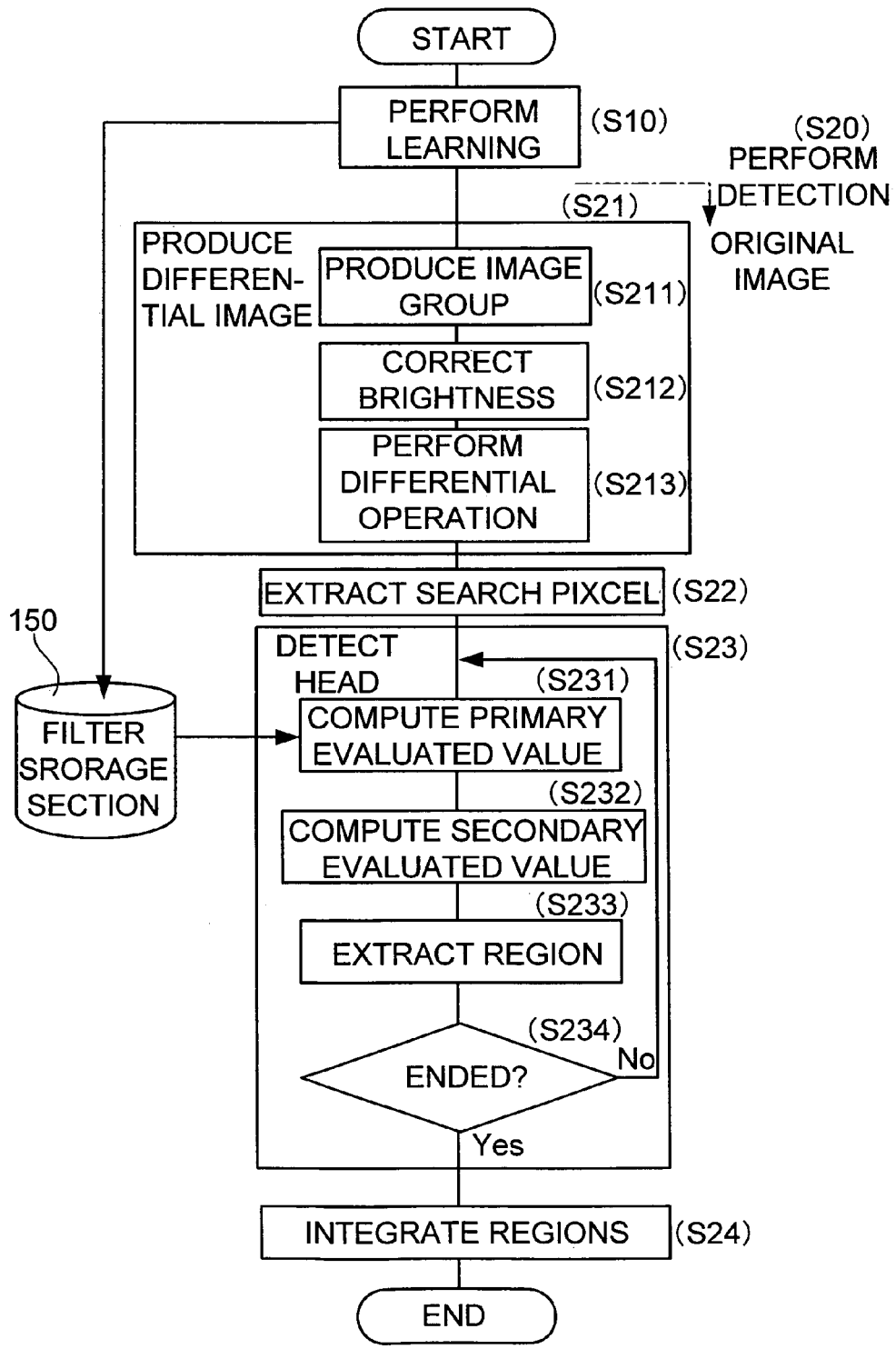
FIG. 5 is a flowchart showing an example of a head detecting method.

In addition to the head detecting program, various support programs are also stored in the hard disk drive 303 to perform a learning step S10 of FIG. 5. Examples of various programs include an image processing program and a program that performs machine learning described below to extract a filter. The image processing program is used to perform various pieces of image processing to the image. In the image processing, the image is displayed on the display screen 32a of the image display device 32, the magnification of the image is independently changed in vertical and horizontal directions according to a manipulation of an operator, and the image is rotated or partially cut out according to the manipulation of the operator.

FIG. 5 is a flowchart showing an example of a head detecting method performed with the personal computer 30 of FIGS. 2 to 4.

The head detecting method of FIG. 5 includes the learning step S10 and a detection step S20. The detection step S20 includes a set of steps S21 to S24 except the learning step S10. The learning step S10 is a step of preparing the detection step S20. In the learning step S10, machine learning (for example, learning with an algorithm of AdaBoosting) is performed using a huge number of images, various filters acting on the original image of the head detecting target in the detection step S20 are extracted. The detailed description of learning step S10 is described later.

The detection step S20 is step of automatically detecting the person's head from the detecting target original image using various filters extracted in the learning step S10. The detection step S20 includes a differential image producing step S21, a search pixel extracting step S22, a head detecting step S23, and a region integrating step S24. The differential image producing step S21 includes an image group generating step S211, a brightness correction step S212, and a differential operation step 213. The head detecting step S23 includes a primary evaluated value computing step S231, a secondary evaluated value computing step S232, a region extracting step S233, and a determination step S234. A determination whether or not the repetition of steps S231, S232, and S233 is ended is made in the determination step S234. The detailed steps constituting the detection step S20 are described later.

Figure 6:
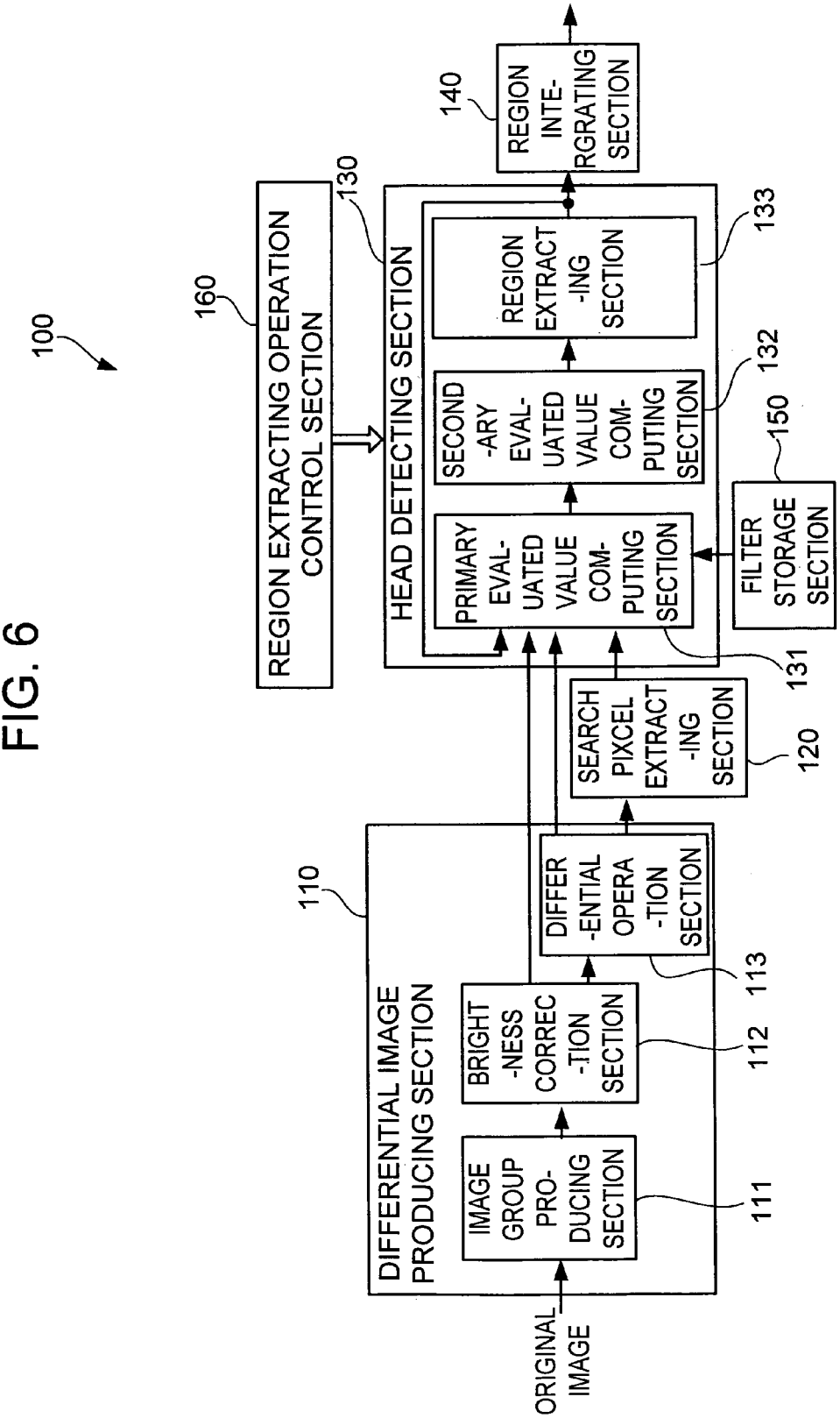
FIG. 6 is a block diagram showing an example of a head detecting apparatus.

FIG. 6 is a block diagram showing an example of the head detecting apparatus. A head detecting apparatus 100 is an algorithm that is realized in the personal computer 30 by executing the head detecting program uploaded in the personal computer 30 of FIGS. 2 to 4. The head detecting apparatus 100 includes a differential image producing section 110; a search pixel extracting section 120, a head detecting section 130, a region integrating section 140, a filter storage section 150, and a region extracting operation control section 160. The differential image producing section 110 includes an image group generating section 111, a brightness correction section 112, and a differential operation section 113. The head detecting section 130 includes a primary evaluated value computing section 131, a secondary evaluated value computing section 132, and a region extracting section 133.

In comparison with the head detecting method of FIG. 5, the whole of the head detecting apparatus 100 of FIG. 6 corresponds to the detection step S20 in the head detecting method of FIG. 5, the differential image producing section 110 corresponds to the differential image producing step S21, the search pixel extracting section 120 corresponds to the search pixel extracting step S22, a combination of the head detecting section 130 and the region extracting operation control section 160 corresponds to the head detecting step S23, and the region integrating section 140 corresponds to the region integrating step S24. Various filters (described later) extracted in the learning step S10 are stored in the filter storage section 150 shown in FIG. 5.

The image group generating section 111, brightness correction section 112, and differential operation section 113 that constitute the differential image producing section 110 correspond to the image group generating step S211, the brightness correction step S212, and the differential operation step S213 in the head detecting step S20 of FIG. 5.

The primary evaluated value computing section 131, secondary evaluated value computing section 132, and region extracting section 133 that constitute the head detecting section 130 correspond to the primary evaluated value computing step S231, secondary evaluated value computing step S232, and the region extracting step S233 that constitute the head detecting step S23 in the head detecting step S20 of FIG. 5. The region extracting operation control section 160 corresponds to the determination step S234 constituting the head detecting step S23.

Because the action of the head detecting program executed in the personal computer 30 is identical to that of the head detecting apparatus shown in FIG. 6, the illustration and description of the head detecting program are omitted.

The action of each component in the head detecting apparatus 100 of FIG. 6 will generally be described below. The description of the action of each component in the head detecting apparatus 100 also serves as the descriptions of the head detecting program and steps constituting the detection step S20 in the head detecting method of FIG. 5. Then the learning step S10 in the head detecting method of FIG. 5 and the head detecting apparatus will specifically be described.

The head detecting apparatus 100 of FIG. 6 is the object detecting apparatus that detects the specific kind of object from the continuous image including plural frames expressed by two-dimensionally arrayed pixels.

Many filters extracted in the learning step S10 of the head detecting method shown in FIG. 5 are stored in the filter storage section 150. The filters act on a search region having a predetermined size two-dimensionally spread on the image, and the filters compute the person's head outline and one of person's head feature quantities which are different from one another. Each of the filters is stored in the filter storage section 150 while correlated with a correspondence relationship between the feature quantity computed by the filter and a primary evaluated value indicating a probability of the person's head. Each of the filters includes plural filters acting on the regions having plural sizes (in this case, 32-by-32 pixels, 16-by-16 pixels, and 8-by-8 pixels in terms of the number of pixels). In the plural sizes, the number of pixels corresponding to the size of the region on the image is changed vertically and horizontally with a ratio of ½.

In the image group generating section 111 constituting the differential image producing section 110, the pixels constituting the fed original image are gradually thinned out vertically and horizontally with the ratio of ½ to produce an image group including the original image and several thinned-out images. In the image group generating section 111, in addition to the image group that is produced by thinning out the original image with the ratio of ½, an interpolated image constituting an image group including the original image is produced by performing an interpolation operation to the original image. The number of pixels of the interpolated image is larger than that of the thinned-out image obtained by vertically and horizontally thinning out the original image with the ratio of ½ (the number of pixels becomes a quarter (the ratio of ½ in each of the vertical and horizontal directions) of that of the original image), and the number of pixels of the interpolated image is smaller than that of the original image. The pixels constituting the produced interpolated image are gradually thinned out vertically and horizontally with the ratio of ½ to produce a new image group including the interpolated image and the thinned-out image obtained by thinning out the pixels of the interpolated image.

The brightness correction section 112 performs brightness correction processing. In the brightness correction processing, when attention focuses on one pixel on the image, a pixel value (brightness value) of the focused pixel is corrected using an average value and a variance of the pixels values (brightness values) of the plural pixels existing in a certain region including the focused pixel. The brightness correction processing is performed to the whole image while each pixel on the image is set at the focused pixel. The brightness correction processing is performed to each image constituting the image group received from the image group generating section 111.

The brightness correction processing performed by the brightness correction section 112 effectively improves the accuracy of head detection when the image in which the brightness heavily depends on the pixel is set at the head detecting target image. Although the head detecting apparatus 100 of the embodiment includes the brightness correction section 112, it is not always necessary to perform the brightness correction processing in the invention.

Figure 1:
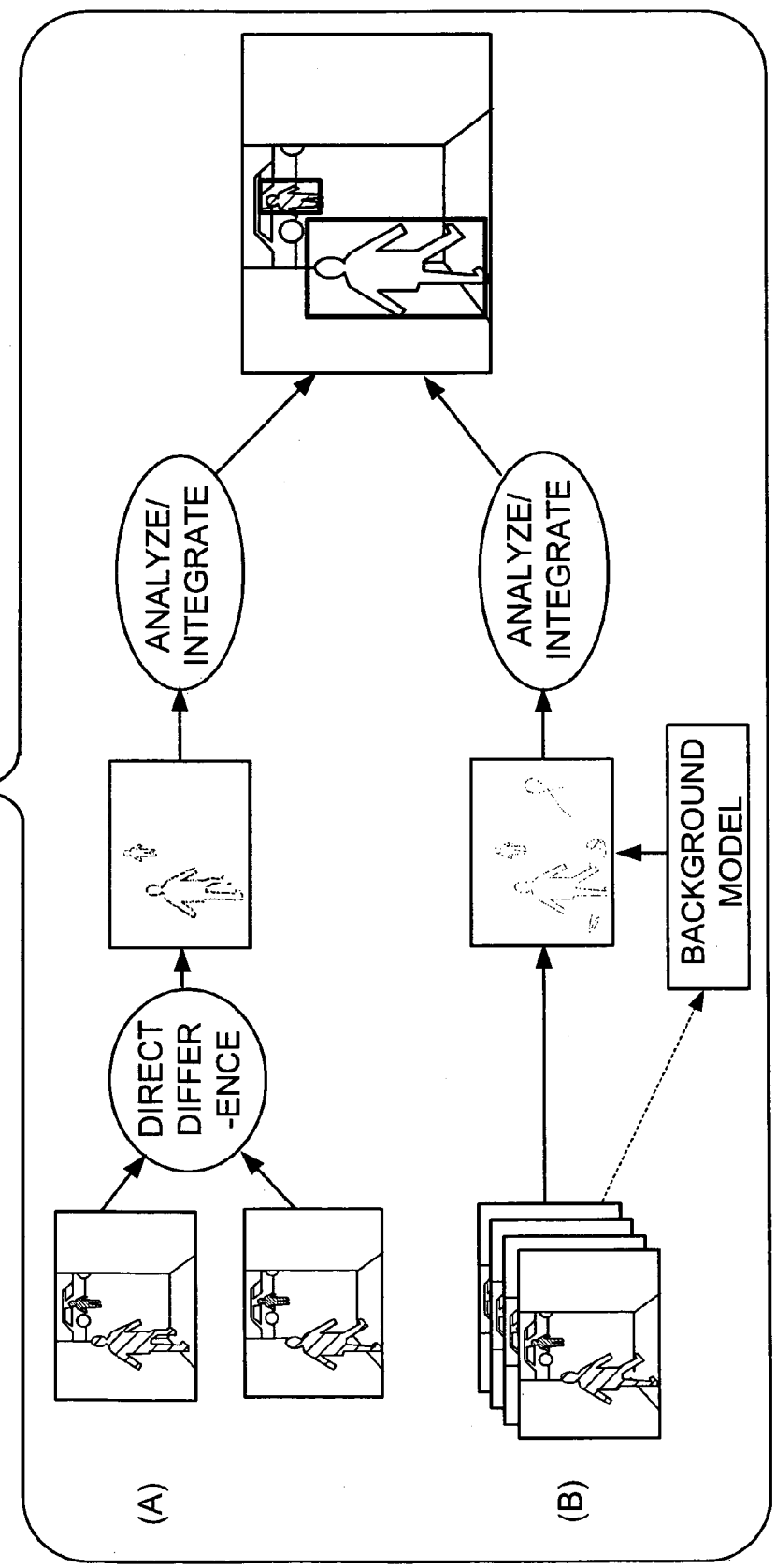
FIG. 1 is an explanatory view showing a method for producing a differential image from background images.

The moving image is fed from the monitoring camera 10 of FIG. 1 into the differential operation section 113 after the image group generating processing performed by the image group generating section 111 and the brightness correction processing performed by the brightness correction section 112. The differential operation section 113 produces a differential image of adjacent frames, and the differential operation section 113 transfers the differential image to the search pixel extracting section 120 and the head detecting section 130. The head detecting apparatus 100 of the embodiment includes the image group generating section 111, the image group generating section 111 produces the image group for each of the adjacent frames, and the differential operation section 113 produces the differential image for the images having the corresponding sizes, which constitute two image groups for the two frames. Accordingly, the differential operation section 113 produces the image group of the differential images.

In the embodiment, the image in which the brightness is already corrected by the brightness correction section 112 is fed into the differential operation section 113, and the differential image produced by the differential operation section 113 is fed into the head detecting section 130. Additionally, the image in which the brightness is already corrected by the brightness correction section 112 is directly fed into the head detecting section 130. This is because the movement information on the human head is used to detect the head with high accuracy by utilizing not only the one-by-one still image but also the differential image as the head detecting target image.

Although described in detail later, in the plural differential images constituting the differential image group produced by the differential operation section 113, the search pixel extracting section 120 performs averaging processing to the differential image to which the head detecting section 130 applies the maximum region filter acting on the maximum search region in the plural search regions whose sizes are gradually different from one another. The maximum region filter is stored in the filter storage section 150. In the averaging processing, an average value of plural pixel values in an averaging region that is tow-dimensionally spread around the pixel is set at the value of the pixel. The averaging region has the same area and the same shape as the maximum search region. Then the search pixel extracting section 120 compares the pixel value of the averaging differential image obtained in the averaging processing and a threshold to extract the search pixel having the large value.

That is, the search image extracting section 120 performs the averaging processing, in which the average value of the averaging region having the same size as the maximum search region is set at the value of the pixel existing in the center of the averaging region, to the differential image (it is not always limited to the differential image having the maximum area, sometimes it is plural differential images on the maximum area side) having the larger area in the differential images, and only the pixel having the new pixel value equal to or larger than the threshold is aimed at the head detection in the object detecting section 130. Therefore, the range where the search is performed by the filter on the detecting target image can be narrowed to perform the high-speed detection processing.

In the embodiment, the averaging processing is performed to the differential image produced by the differential operation section 113. Alternatively, the averaging processing is performed to each of the two frame images before the differential operation section 113 produces the differential image, the averaging differential image is produced in order to extract the search pixel by the differential operation between the two frame images after the averaging processing, and the search image may be extracted from the averaging differential image.

In the head detecting section 130, the primary evaluated value computing section 131 applies plural filters to each region on the head detecting target image to compute plural feature quantities, and the primary evaluated value computing section 131 obtains a primary evaluated value corresponding to each feature quantity based on the correspondence relationship (between the feature quantity computed by the filter and the primary evaluated value indicating the probability of the human head) correlated with each filter. Then the secondary evaluated value computing section 132 puts together the plural primary evaluated values corresponding to the plural filters, obtained by the primary evaluated value computing section 131, using an operation such as addition and average value computation, thereby obtaining the secondary evaluated value indicating the existing probability of the human head in the region. Then the region extracting section 133 compares the secondary evaluated value obtained by the secondary evaluated value computing section 132 and the threshold to extract the region where the existing probability of the human head is higher than the threshold. In the head detecting apparatus 100 of FIG. 6, the human head is detected by extracting the region with the region extracting section 133.

In the head detecting section 130, under the sequence control of the region extracting operation control section 160, the primary evaluated value computing section 131, the secondary evaluated value computing section 132, and the region extracting section 133 are repeatedly operated, and the region where the human head appears is finally extracted with an extremely high probability. The region extracting operation control section 160 controls the operations of the primary evaluated value computing section 131, secondary evaluated value computing section 132, and region extracting section 133 that constitute the head detecting section 130 as follows.

The region extracting operation control section 160 causes the primary evaluated value computing section 131, secondary evaluated value computing section 132, and region extracting section 133 to perform a first extraction process. That is, the region extracting operation control section 160 causes the primary evaluated value computing section 131 to apply plural first filters acting on a relatively narrow search region in many filters stored in the filter storage section 150 to the search region centered around the pixel corresponding to the search pixel extracted by the search pixel extracting section 120 on the relatively small first image in the image group (including the differential image group produced by the differential operation section 113) produced by the image group generating section 111, and the region extracting operation control section 160 causes the primary evaluated value computing section 131 to compute the plural feature quantities to obtain the primary evaluated value corresponding to each feature quantity based on the correspondence relationship. The region extracting operation control section 160 causes the secondary evaluated value computing section 132 to put together the plural primary evaluated values corresponding to the plural first filters, obtained by the primary evaluated value computing section 131, thereby causing the secondary evaluated value computing section 132 to obtain the secondary evaluated value indicating the existing probability of the human head in the region. The region extracting operation control section 160 causes the region extracting section 133 to compare the secondary evaluated value obtained by the secondary evaluated value computing section 132 and a first threshold to perform a first extraction process for extracting a primary candidate region where the existing probability of the human head is higher than the first threshold.

At this point, the whole first image is not searched with the first filter, but the first filter is applied only to the pixel corresponding to the search pixel having the existing probability of the head. Therefore, the high-speed processing can be realized by searching only the narrow search range.

In the embodiment, when the first filter is applied to the pixel corresponding to the search pixel on the first image, the first filter is applied only to the pixel corresponding to the search pixel with respect to not only the relatively small first image in the differential image group but also the relatively small first image in the image group of each of two still images including two frame images that is the basis of the production of the differential image. Thus, in the embodiment, the search pixel having the existing probability of the head is obtained from the differential image, and the search pixel is applied to the still image, thereby also achieving the high-speed search of the still image. However, when the human stands still, the human head disappears on the differential image even if the human head emerges on the still image. Accordingly, the whole first image may become the search target when the relatively small first image in the image group of the still images is searched with the filter while the search range is not narrowed for the still image by the search pixel obtained from the differential image.

Then the region extracting operation control section 160 causes the primary evaluated value computing section 131, secondary evaluated value computing section 132, and region extracting section 133 to perform a second extraction process. That is, the region extracting operation control section 160 causes the primary evaluated value computing section 131 to compute plural feature quantities by applying plural second filters acting on a region wider by one stage than that of the plural first filters in the filter group stored in the filter storage section 150 to a region corresponding to a primary candidate region of the second image in which the number of pixels is larger by one stage than that of the first image in the image group produced by the image group generating section 111 and differential operation section 113, and the region extracting operation control section 160 causes the primary evaluated value computing section 131 to obtain the primary evaluated value corresponding to each feature quantity based on the correspondence relationship. The region extracting operation control section 160 causes the secondary evaluated value computing section 132 to put together the plural primary evaluated values corresponding to the plural second filters, obtained by the primary evaluated value computing section 131, thereby causing the secondary evaluated value computing section 132 to obtain the secondary evaluated value indicating the existing probability of the human head in the primary candidate region. The region extracting operation control section 160 causes the region extracting section 133 to compare the secondary evaluated value obtained by the secondary evaluated value computing section 132 and a second threshold to perform a second extraction process for extracting a secondary candidate region where the existing probability of the person's head is higher than the second threshold.

The region extracting operation control section 160 causes the primary evaluated value computing section 131, secondary evaluated value computing section 132, and region extracting section 133 to sequentially repeat the plural extraction processes including the first extraction process and the second extraction process from the extraction process for applying the filter acting on the relatively narrow region to the relatively small image toward the extraction process for applying the filter acting on the relatively wide region to the relatively large image.

In the head detecting apparatus 100 of FIG. 6, the region extracting section 133 finally extracts the region by the repetition, thereby detecting the human head with high accuracy.

As described above, in the image group producing section 111, the plural image groups are produced from one original image by the interpolation operation and the thinning-out operation. For each of the plural image groups (including the image group of the differential images produced by the differential operation section 113) produced by the image group generating section 111, the region extracting operation control section 160 causes the primary evaluated value computing section 131, secondary evaluated value computing section 132, and region extracting section 133 to sequentially repeat the plural extraction processes from the extraction process for applying the filter acting on the relatively narrow region to the relatively small image toward the extraction process for applying the filter acting on the relatively wide region to the relatively large image.

Therefore, the human heads having various sizes can be detected.

Sometimes both a first region and a second region are extracted as the human head region from the region extracting section 133. The first region includes the human face in the substantial center of the image. The second region includes the head including the hair of the same person in the substantial center of the same image. In the second region, compared with the first region, the head partially overlaps another item while the head is separated from another item. Therefore, in such cases, the head detecting apparatus 100 of FIG. 6 includes the region integrating section 140 to perform processing of integrating the plural regions into one region. Specifically, when the plural regions are extracted by the region extracting section 133, the plural regions are integrated into one region according to a degree of the overlapping between the plural regions. The detailed description is made later.

The embodiments of the invention will be described more specifically below.

Figure 7:
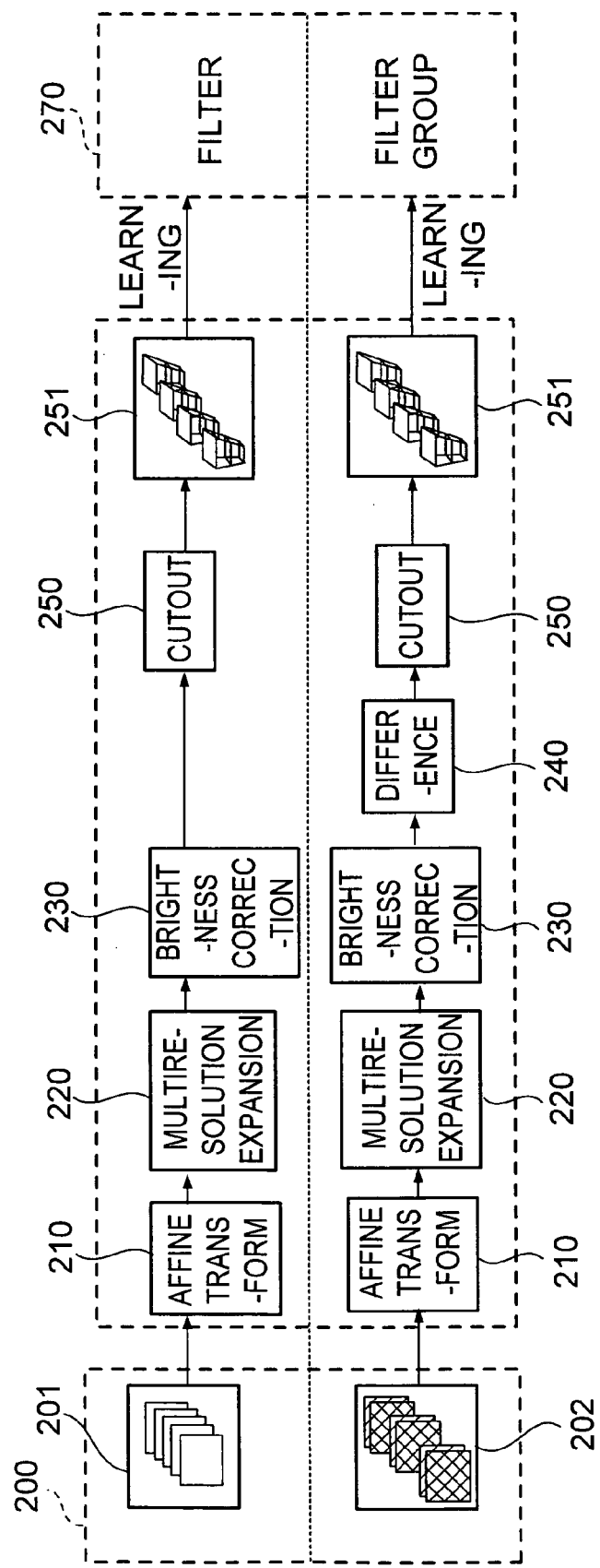
FIG. 7 is a detailed flowchart showing a learning step in the head detecting method of FIG. 5.

FIG. 7 is a detailed flowchart showing the learning step S10 in the head detecting method of FIG. 5.

FIG. 7 shows two flowcharts, the flowchart in the upper stage shows processing for dealing with one-by-one still image before the difference is computed, and the flowchart in the lower stage shows processing for dealing with the differential image.

First, many images 200 are prepared to produce a teacher image. The many images 200 include many still images 201 and moving images 202 for producing the differential image.

Each image constituting the moving images 202 may be used as the still image 201. Preferably the images 200 are obtained by the monitoring camera 10 (see FIG. 1) which takes the head detecting original image. The images 200 are not limited to the images obtained by the monitoring camera 10. For example, instead of the images taken by the monitoring camera 10, the image 200 may be obtained by collecting the images in various scenes in which persons exist and the images in various scenes in which persons do not exist.

Affine transform processing 210, multi-resolution expansion processing 220, and brightness correction processing 230 are sequentially performed to the images 200, and the differential image is produced from the moving image 202 through differential operation processing 240. Then a teacher image 251 is produced through cutout processing 250. The teacher image 251 is formed by a teacher image group for each scene. The teacher image group includes a 32-by-32-pixel teacher image, a 16-by-16-pixel teacher image, and an 8-by-8-pixel teacher image. The teacher image group is produced for each of many scenes.

The affine transform processing 210, the multi-resolution expansion processing 220, the brightness correction processing 230, the differential operation processing 240, and the cutout processing 250 will be described below.

In the affine transform processing 210, many images are produced by changing one image little by little instead of the collection of extremely many images, thereby increasing the number of images which becomes the basis of the teacher image. At this point, the images are produced by inclining the one original image by −12°, −6°, 0°, +6°, and +12°. Additionally, the images are produced by vertically scaling the original image by 1.2 times, 1.0 time, and 0.8 time, and the images are produced by horizontally scaling the original image by 1.2 times, 1.0 time, and 0.8 time. In the produced images, the image having the inclination of 0°, the vertical scale factor of 1.0 time, and the horizontal scale factor of 1.0 time is the original image. The 45 (=5×3×3) images including the original image are produced from the one original image by a combination of the inclination and the scaling. Therefore, a great number of teacher images are produced, which enables the high-accuracy learning.

The multi-resolution expansion processing 220 will be described below.

Figure 8:
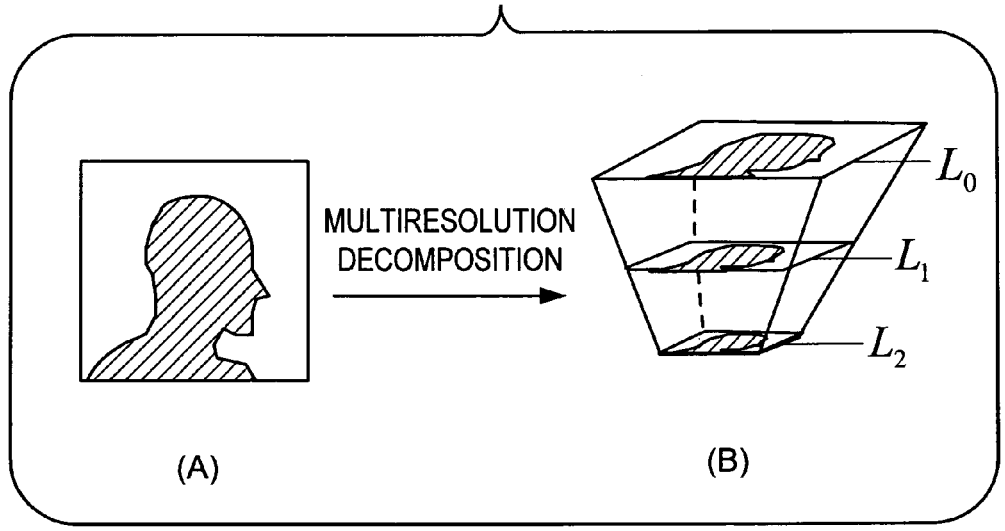
FIG. 8 is an explanatory view of multi resolution expansion processing.

FIG. 8 is an explanatory view of the multi-resolution expansion processing.

The person's head appears in FIG. 8 and the teacher image is already obtained. However, in the multi-resolution expansion processing 220 of FIG. 7, the following processing is performed to the whole of the image before the image is cut out as the teacher image.

Assuming that Lo is the one original image shown in part (A) of FIG. 8, an image $L_1$ which is vertically and horizontally reduced into ½ (¼ in area) is produced by vertically and horizontally thinning out every other pixel from the original image Lo. Similarly an image $L_2$ which is vertically and horizontally reduced into ½ (¼ in area) is produced by vertically and horizontally thinning out every other pixel from the image $L_1$. Part (B) of FIG. 8 shows an image group produced in the above-described manner in an inverted pyramid structure, the image group includes three images Lo, $L_1$, and $L_2$.

Then the brightness correction processing 230 is performed.

In the brightness correction processing 230, the pixel value (brightness value) after the correction is obtained by the following equation (1). Where $X_{org}$ is a pixel value (brightness value) of a pixel X before the correction, $X_{cor}$ is brightness after the correction.

$$X_{cor} = \frac{X_{org} - E(X_{org})}{\sigma(X_{org})} \quad (1)$$

$E(X_{org})$ and $\sigma(X_{org})$ are an average value and a variance of the pixel value (brightness value) in the neighborhood (for example, 9-by-9 pixel) of the pixel X. The brightness correction is performed by performing the brightness correction processing 230 to the whole of the image.

The brightness correction is performed to each of the three-layer images Lo, $L_1$, and $L_2$ shown in part (B) of FIG. 8. That is, the brightness correction is performed to the image $L_2$ in the lower layer using the scene of the region which is wider than that of the original image.

Then the differential processing 240 is performed to the moving image.

Figure 9:
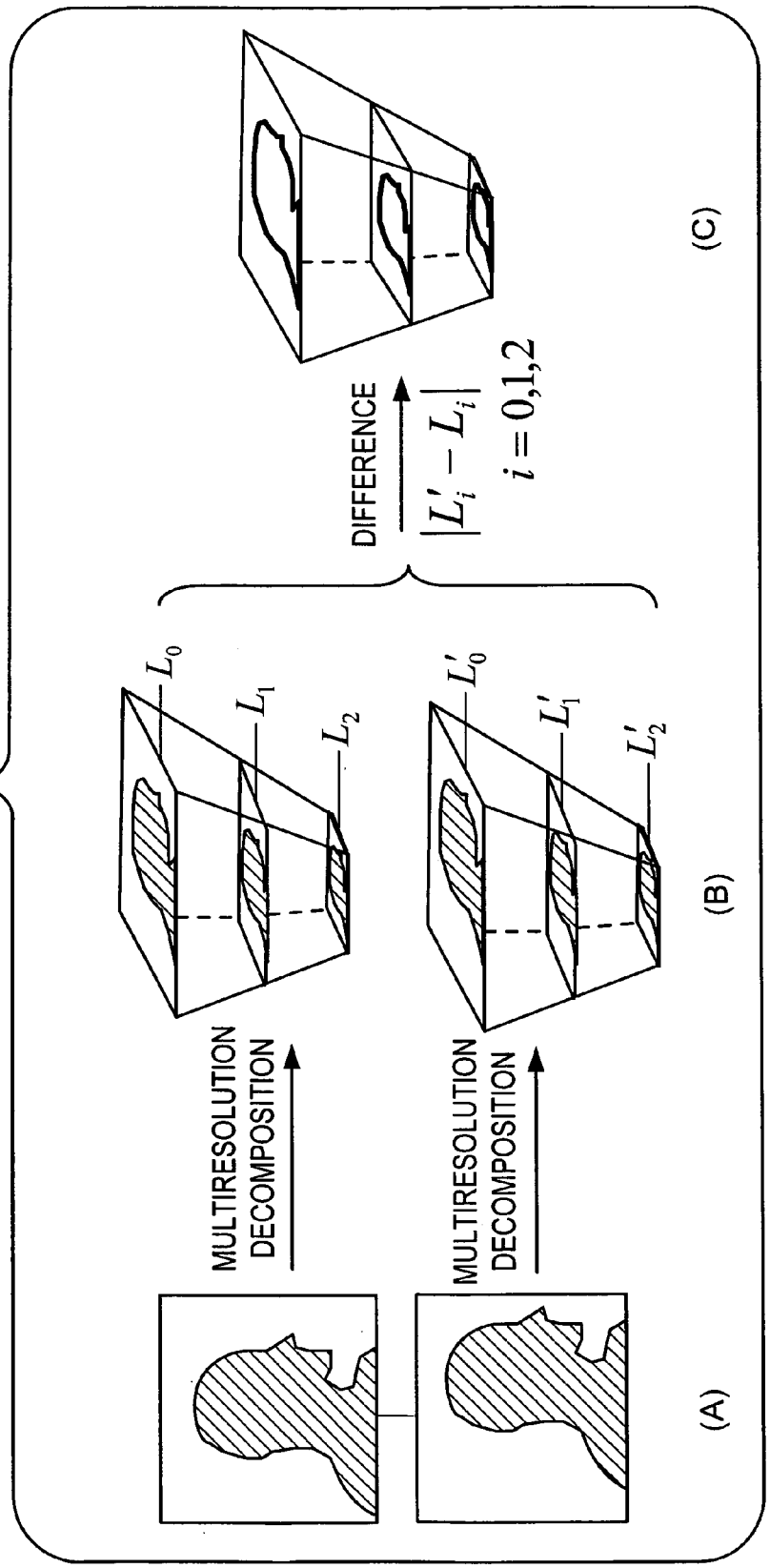
FIG. 9 is an explanatory view of moving image differential processing.

FIG. 9 is an explanatory view of the moving image differential processing.

Part (A) of FIG. 9 shows the images of two frames adjacent to each other in the moving image. Two image group which include images Lo, $L_1$, and $L_2$ and images Lo', $L_1$', and $L_2$' respectively are produced from the two images through the multi-resolution expansion processing 220 (part (B) of FIG. 9).

The brightness correction processing 230 is performed to the images Lo, $L_1$, and $L_2$ and images Lo', $L_1$', and $L_2$' constituting the two image groups, and the differential processing 240 is performed to the images Lo, $L_1$, and $L_2$ and images Lo', $L_1$', and $L_2$'.

In the differential processing 240, an absolute value ($|L_i'-L_i|$, i=0, 1, and 2) of the differential value in each corresponding pixel is obtained for the images having the same size, and the inverted-pyramid-shape image group including the three differential images shown in part (C) of FIG. 9 is produced.

Then the cutout processing is performed.

In the cutout processing 250, the region where the person's head in various modes appears or the region where the subject except for the person's head appears is cut out from the image having the three-layer structure shown in part (B) of FIG. 8 and part (C) of FIG. 9, the a teacher image that the person's head exists is produced from the region where the person's head appears, and a teacher image that the person's head does not exist is produced from the region where the subject except for the person's head appears.

In cutting out the teacher image, the 32-by-32-pixel region is cut out as the teacher image from the uppermost-layer image in the three-layer images shown in part (B) of FIG. 8 and part (C) of FIG. 9, the 16-by-16-pixel region of the same portion is cut out from the second-layer image, and the 8-by-8-pixel region of the same portion is cut out from the third-layer image. The cut-out three-layer teacher images differ from one another in resolution because of the different image sizes. However, the three-layer teacher images are cut out from the same portion on the image. Accordingly, the teacher images also become the inverted-pyramid-shape teacher image group having the three-layer structure shown in part (B) of FIG. 8 and part (C) of FIG. 9.

The many teacher image groups 251 having the three-layer structures are produced and used for the learning.

The filter on the side in which the learning is performed by the teacher images will be described.

Figure 10:
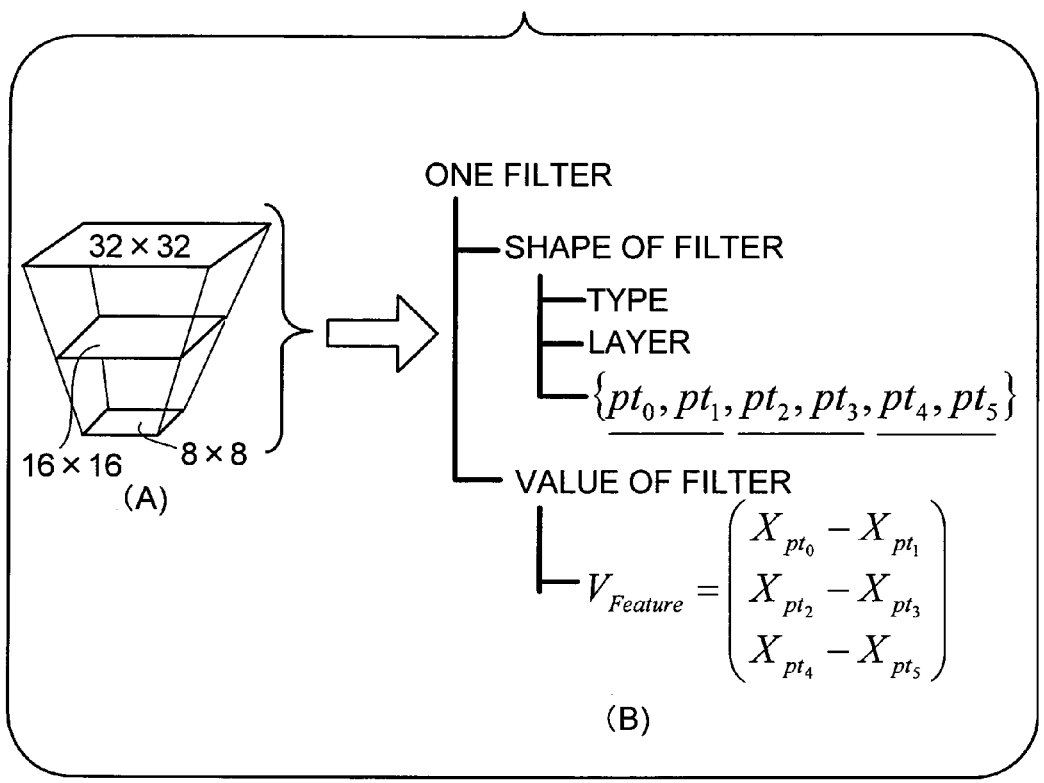
FIG. 10 is an explanatory view of a filter structure.
Figure 11:
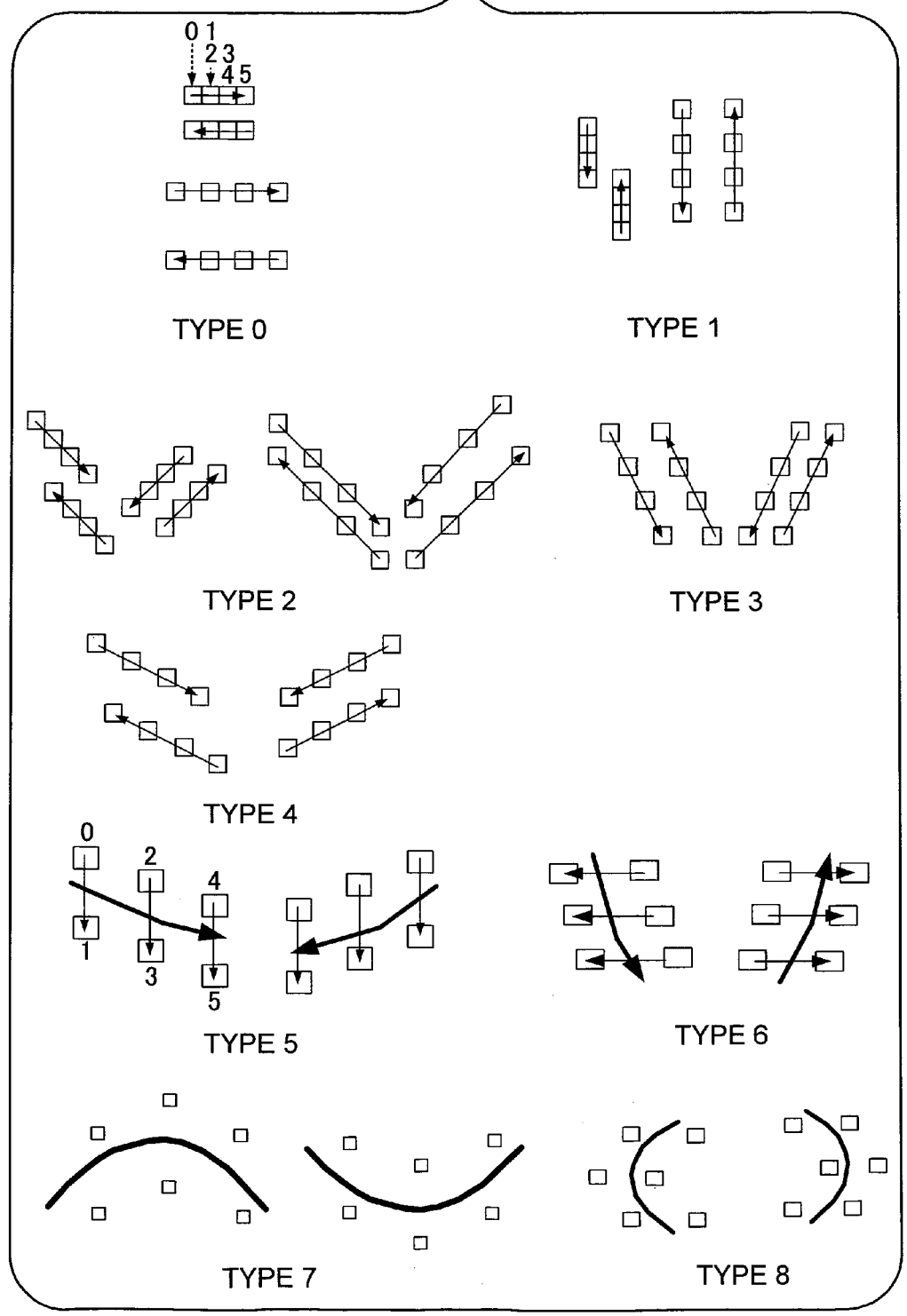
FIG. 11 illustrates various filters.

FIG. 10 is an explanatory view of a filter structure, and FIG. 11 illustrates various filters.

At this point, various kinds of filters are prepared. The filters are divided into the filter acting on the 32-by-32-pixel region on the image, the filter acting on the 16-by-16-pixel region on the image, and the filter acting on the 8-by-8-pixel region on the image. The filters are a filter candidate used to detect the head until the filter is extracted by the learning. In the filter candidates, the filter candidate acting on the 32-by-32-pixel region is selected by the learning performed using the 32-by-32-pixel teacher image in the teacher image group having the three-layer structure shown in part (A) of FIG. 10, and the filter which should be used to detect the head is extracted. Similarly, the filter candidate acting on the 16-by-16-pixel region in the many filter candidates is selected by the learning performed using the 16-by-16-pixel teacher image in the teacher image group having the three-layer structure, and the filter which should be used to detect the head is extracted. Similarly, the filter candidate acting on the 8-by-8-pixel region in the many filter candidates is selected by the learning performed using the 8-by-8-pixel teacher image in the teacher image group having the three-layer structure, and the filter which should be used to detect the head is extracted.

As shown in part (B) of FIG. 10, one filter has attributes of a type, a layer, and six pixel coordinates $\{pto, pt1, pt2, pt3, pt4, $ and $pt5\}$. Assuming that $X_{pto}, X_{pt1}, X_{pt2}, X_{pt3}, X_{pt4}$ and $X_{pt5}$ are pixel values (brightness values) of the pixels located at the six pixel coordinates, vectors of three differential values are computed by the following operation.

$$V_{Feature} = \begin{pmatrix} X_{pt_0} - X_{pt_1} \\ X_{pt_2} - X_{pt_3} \\ X_{pt_4} - X_{pt_5} \end{pmatrix} \quad (2)$$

The "type" indicates a large classification such as type 0 to type 8 shown in FIG. 11. For example, type 0 on the upper left of FIG. 11 indicates a filter which computes the difference in the horizontal direction ($\theta=0°$), type 1 indicates a filter which computes the difference in the vertical direction ($\theta=\pm90°$), and types 2 to 4 indicate filters which compute the difference in the direction of each type. Types 5 to 8 indicate filters which detect an edge of each curved line by the differential operation shown in FIG. 11. The "layer" is an identification marker indicating which the filter acting on the 32-by-32-pixel region, the filter acting on the 16-by-16-pixel region, or the filter acting on the 8-by-8-pixel region.

The six pixel coordinates $\{pt0, pt1, pt2, pt3, pt4,$ and $pt5\}$ designate coordinates of the six pixels in the 64 ($=8\times8$) pixels in cases where the filter acts on the 8-by-8-pixel region. The same holds true for the filter acting on the 16-by-16-pixel region and the pixel acting on the 32-by-32-pixel region.

The operation performed using the equation (2) is performed to the six pixels designated by the six pixel coordinates $\{pt0, pt1, pt2, pt3, pt4,$ and $pt5\}$. For example, in the case of the top filter in the type 0 on the upper left of FIG. 11, assuming that Xo is a brightness value of the pixel to which the numerical value of 0 is appended, $X_1$ is a brightness value of the pixel to which the numerical value of 1 is appended, $X_2$ ($=X_1$) is a brightness value of the pixel (at this point, the pixel to which the numerical value of 2 is appended is identical to the pixel to which the numerical value of 1 is appended) to which the numerical value of 2 is appended, $X_3$ is a brightness value of the pixel to which the numerical value of 3 is appended, $X_4$ ($=X_3$) is a brightness value of the pixel (at this point, the pixel to which the numerical value of 4 is appended is identical to the pixel to which the numerical value of 1 is appended) to which the numerical value of 4 is appended, and $X_5$ is a brightness value of the pixel to which the numerical value of 5 is appended, the following equation (3) is obtained.

$$V_{Feature} = \begin{pmatrix} X_0 - X_1 \\ X_2 - X_3 \\ X_4 - X_5 \end{pmatrix} \quad (3)$$

The numerical values of 0 to 5 are appended to the filters on the left side of the type 5, and the operation similar to that of the equation (3) is performed.

In the various filters of FIG. 11, the operations similar to that of the type 0 or type 5 are performed.

As shown in FIG. 7, when the teacher image group 251 is produced, a filter 270 used to detect the head is extracted from many filter candidates by the machine learning.

The machine learning will be described below.

Figure 12:
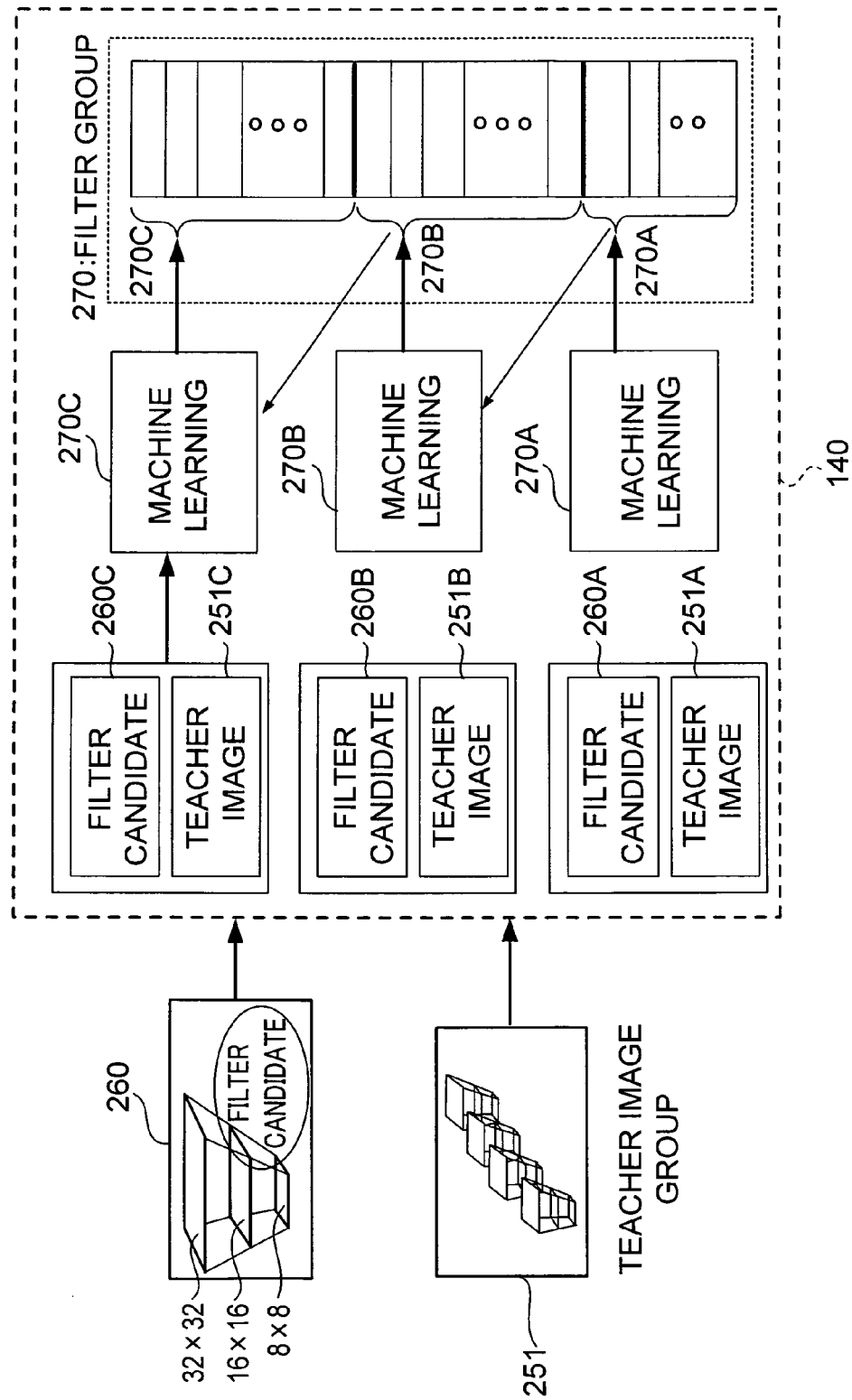
FIG. 12 is a conceptual view of machine learning.

FIG. 12 is a conceptual view of the machine learning.

As described above, many filter candidates 260 are prepared while the many teacher image groups 251 are prepared, a filter 270A used to detect the head is extracted from filter candidates 260A acting on the 8-by-8-pixel region using many 8-by-8-pixel teacher images 251A in the teacher image groups 251. Then, while the extraction result is reflected, a filter 270B used to detect the head is extracted from filter candidates 260B acting on the 16-by-16-pixel region using many 16-by-16-pixel teacher images 251B. Then, while the extraction result is reflected, a filter 270C used to detect the head is extracted from filter candidates 260B acting on the 32-by-32-pixel region using many 32-by-32-pixel teacher images 251C.

At this point, the Adaboost algorithm is employed as an example of the machine learning. Because the Adaboost algorithm is already employed in the wide fields, the Adaboost algorithm will simply be described below.

Figure 13:
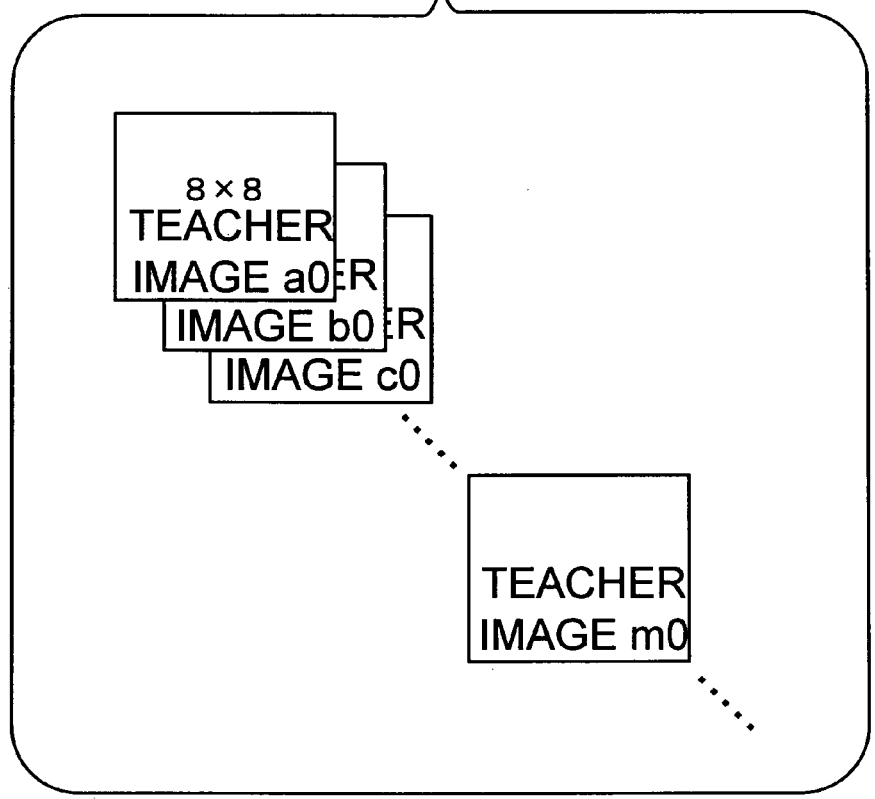
FIG. 13 is a conceptual view of a teacher image.

FIG. 13 is a conceptual view of the teacher image.

At this point, it is assumed that 8-by-8-pixel many teacher images a0, b0, c0, . . . , and m0 are prepared. The teacher images include the teacher image which is of the head and the teacher image which is not of the head.

Figure 14:
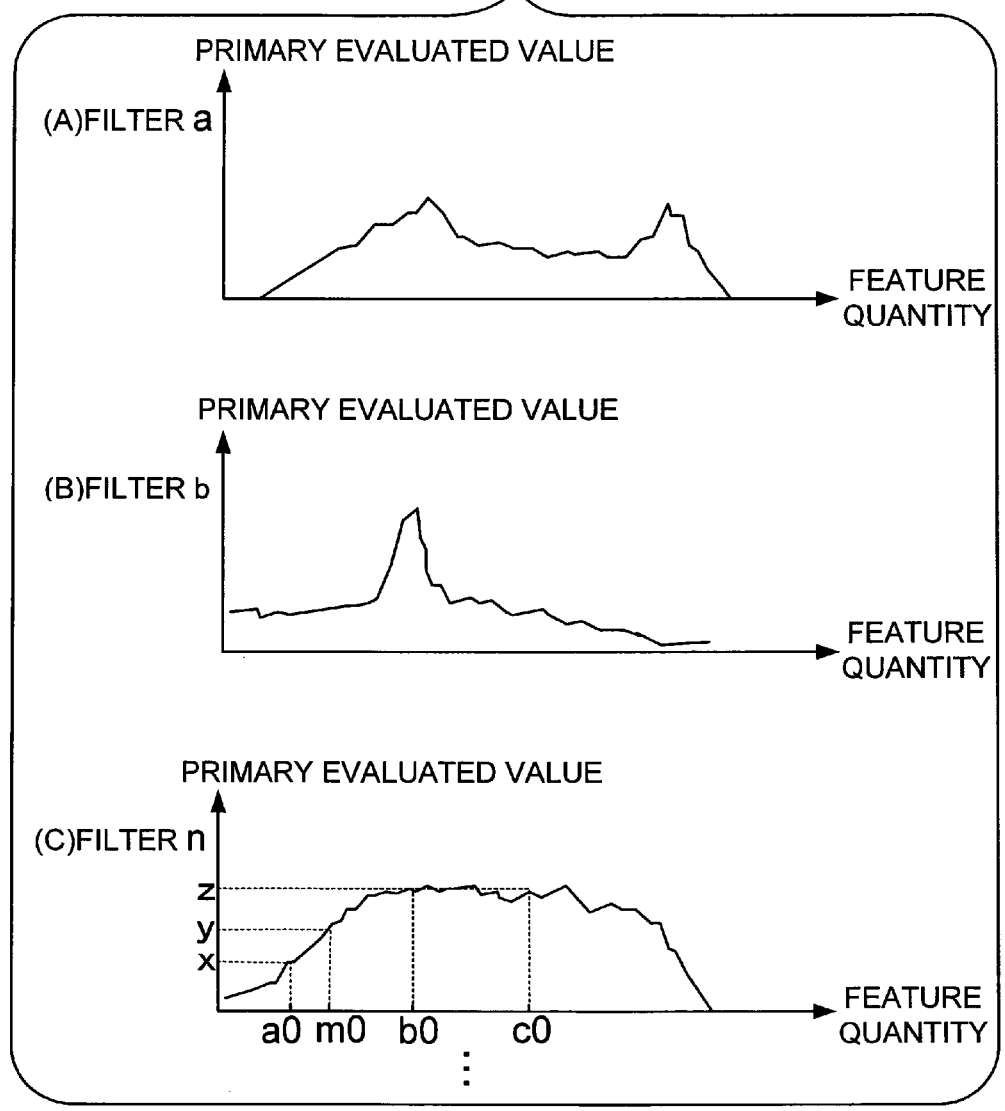
FIG. 14 is a conceptual view showing various filters and learning results of the filters.

FIG. 14 is a conceptual view showing various filters and learning results of the filters.

Here, various filters (in this stage, filter candidate) a, b, . . . , and n acting on the 8-by-8-pixel region are prepared, and the learning is performed to each of the filters a, b, . . . , and n using the many teacher images of FIG. 13.

Each graph of FIG. 14 shows the learning result for each filter.

A feature quantity including a three-dimensional vector expressed by the equation (2) is computed in each filter. For the sake of convenience, the feature quantity is shown as a one-dimensional feature quantity.

In the graphs of FIG. 14, a horizontal axis indicates the value of the feature quantity obtained for each of the many teacher images using the filter, and a vertical axis indicates percentage of correct answer on the head using the filter. The probability is used as the primary evaluated value.

It is assumed that, as a result of performing the first learning to each of the filters a, b, . . . , and n, the learning result is obtained as shown in FIG. 14 and the percentage of correct answer becomes the maximum when the filter n is used. In this case, the filter n is used as the head detecting filter, and the second learning is performed to the filters a, b, except the filter n.

As shown in part (C) of FIG. 14, it is assumed that the primary evaluated values of x, y, z, and z are obtained for the teacher images a0, b0, c0, and m0.

FIG. 15 is an explanatory view showing weighting the teacher image.

The first learning is performed to all the teacher images a0, b0, c0, . . . , and m0 with the same weight of 1.0. On the other hand, in the second learning, the probabilities of x, y, z, and z of the teacher images are added to the teacher images a0, b0, c0, . . . , and m0 by the filter n in which the maximum percentage of correct answer is obtained in the first learning, the weight is lowered for the teacher image having the high possibility of correct answer, and the weight is increased for the teacher image having the low possibility of correct answer. The weight is reflected on the percentage of correct answer of each teacher image in the second learning. That is, in the second learning, the weight is the same thing that each teacher image is repeatedly used for the learning by the number of times of the weight. In the second learning, the filter candidate in which the maximum percentage of correct answer is obtained is extracted as the head detecting filter. The weights for the teacher images a0, b0, c0, and m0 are corrected again using the graph of the percentage of correct answer on the feature quantity of the extracted filter, and the learning is performed to the remaining filters except for the currently extracted filter. The many head detecting filters 270A (see FIG. 12) acting on the 8-by-8-pixel region are extracted by repeating the learning.

FIG. 16 is an explanatory view of a weighting method in making a transition to the learning of the 16-by-16-pixel filter after the 8-by-8-pixel filter is extracted.

After the 8-byb-8-pixel filter is extracted, the correspondence relationship (for example, the graph shown in FIG. 14) between the feature quantity and the primary evaluated value is obtained for the filters when each of the filters is independently used, and the secondary evaluated value is obtained for each teacher image (for example, the teacher image a0) by adding the primary evaluated value of each of the filters which are obtained from the feature quantities obtained by the many 8-by-8-pixel filters. As shown in FIG. 16, it is assumed that secondary evaluated values A, B, C, . . . , and M are obtained for the teacher images a0, b0, c0, . . . , and m0. At this point, the weights of the 16-by-16-pixel teacher images a1, b1, c1, . . . , and m1 corresponding to the 8-by-8-pixel teacher images a0, b0, c0, . . . , and m0 are changed from the weight of 1.0 which is equal to all the images using the secondary evaluated values A, B, C, . . . , and M, and the changed weights are used for learning to extract the filter acting on the 16-by-16-pixel region.

Hereinafter, the extraction algorithm for the filter of the 16-by-16-pixel region, the weighting changing algorithm, and the algorithm for making the transition to the extraction of the filter of the 32-by-32-pixel region are similar to those described above, so that the description is not repeated here.

Thus, the filter group 270 including the many filters 270A acting on the 8-by-8-pixel region, the many filters 270B acting on the 16-by-16-pixel region, and the many filters 270C acting on the 32-by-32-pixel region is extracted, the correspondence relationship (any one of a graph, a table, and a function formula) between the feature quantity (vector of the equation (2)) and the primary evaluated value is obtained for each filter, and the filter group 270 and the correspondence relationship are stored in the filter storage section 150 of FIGS. 5 and 6.

The head detecting processing with the filter stored in the filter storage section 150 will be described below.

The pieces of processing similar to those of the multiresolution expansion processing 220, brightness correction processing 230, and differential operation processing 240 of FIG. 7, which are performed in the learning are performed in the image group generating section 111, brightness correction section 112, and differential operation section 113 of FIG. 6. However, the processing performed by the image group generating section 111 is slightly different from that by the multiresolution expansion processing 220, and the description will be made below.

Figure 17:
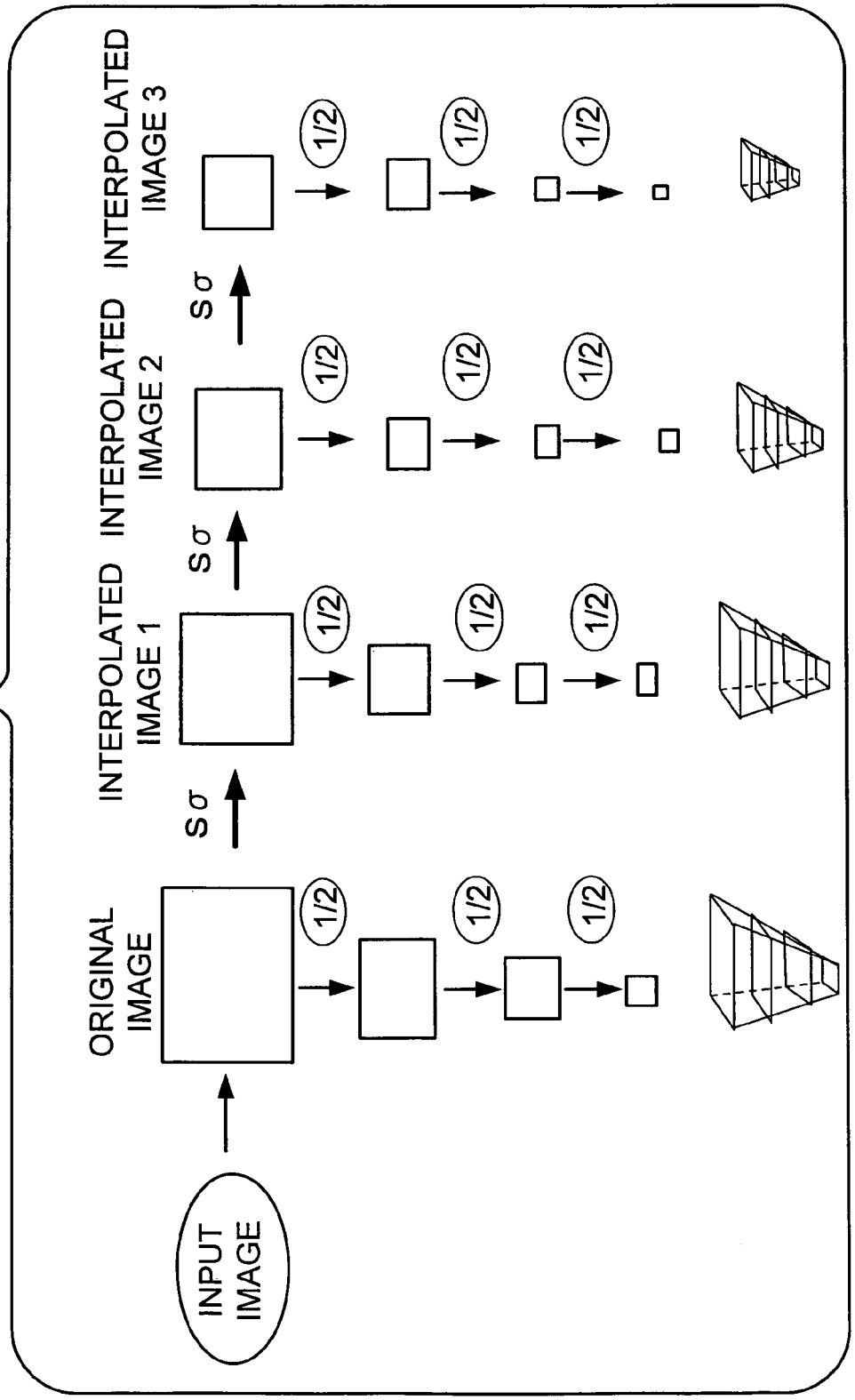
FIG. 17 is a schematic diagram showing processing performed by an image group producing section of FIG. 6.

FIG. 17 is a schematic diagram showing the processing performed by the image group producing section 111 of FIG. 6.

The moving image taken by the monitoring camera 10 of FIG. 2 is fed into the image group producing section 111, and the processing of FIG. 17 is performed to each of the images constituting the moving image.

Interpolation operation processing is performed to the original image which is of the input image, an interpolated image 1 which is slightly smaller than the original image is obtained, and an interpolated image 2 which is slightly smaller than the interpolated image 1 is obtained. Similarly an interpolated image 3 is obtained.

A ratio $S\sigma$ of the image size between the original image and the interpolated image 1 is expressed for each of the vertical and horizontal directions by the following equation (4).

$$S\sigma = 2^{-\frac{1}{N}} \qquad (4)$$

Where N is the number of interpolated images including the original image (N=4 in the example of FIG. 17).

After the interpolated images (interpolated images 1, 2, and 3 in the example of FIG. 17) are produced, the images having the sizes of ½ in the vertical and horizontal directions are produced by thinning out every other pixel from the original image and interpolated images in the vertical and horizontal directions, the images having the sizes of ¼ in the vertical and horizontal directions are produced by thinning out every other pixel from the original image and interpolated images having the sizes of ½ in the vertical and horizontal directions, and the images having the sizes of ⅛ in the vertical and horizontal directions are produced by thinning out every other pixel from the original image and interpolated images having the sizes of ¼ in the vertical and horizontal directions. Therefore, in the example of FIG. 17, four inverted-pyramid-shape image groups having four layers are produced from the one original image.

The heads having various sizes can be extracted by producing the images having many sizes.

The pieces of processing performed by the brightness correction section 112 and differential operation section 113 of FIG. 6 are identical to the brightness correction processing 230 and differential operation processing 240 of FIG. 7, so that the overlapping description is omitted.

However, in the differential operation processing 240 of FIG. 7, the differential image group having the three-layer inverted pyramid structure is produced between the adjacent frames with reference to FIG. 9. On the other hand, in the differential operation section 113 of FIG. 6, four image groups having the same structure as that of FIG. 17 are produced for each two adjacent frames. Each of the image group includes the four-layer differential image.

The image group of the differential images produced by the differential operation section 113 is fed into the search pixel extracting section 120. The search pixel extracting section 120 extracts the search pixel by performing the following averaging processing to the differential image (in this case, the differential image of the maximum area and the differential image of the area smaller by one step than the maximum area for each of the four image groups of FIG. 17) to which the filter acting on the maximum-size region (in the embodiment, 32-by-32-pixel region) is applied in the fed image group of the differential images.

At this point, in the embodiment, in terms of size, there are three kinds of filters of the filter acting on the 32-by-32 pixel region, the filter acting on the 16-by-16-pixel region, and the filter acting on the 8-by-8-pixel region. For each of the four image groups shown in FIG. 17, the primary evaluated value computing section 131 of the head detecting section 130 applies the filter acting on the 8-by-8-pixel region to the smallest image and the second smallest image, the primary evaluated value computing section 131 applies the filter acting on the 16-by-16-pixel region to the second smallest image and the third smallest image (that is, the second largest image), and the primary evaluated value computing section 131 applies the filter acting on the 32-by-32-pixel region to the second largest image and the largest image. Accordingly, the search pixel extracting section 120 extracts the search pixel by performing the averaging processing to the largest differential image and the second largest differential image in each image group of the differential images. The largest differential image and the second largest differential image are the images to which the primary evaluated value computing section 131 applies the filter acting on the maximum-area region (32-by-32-pixel region).

Figure 18:
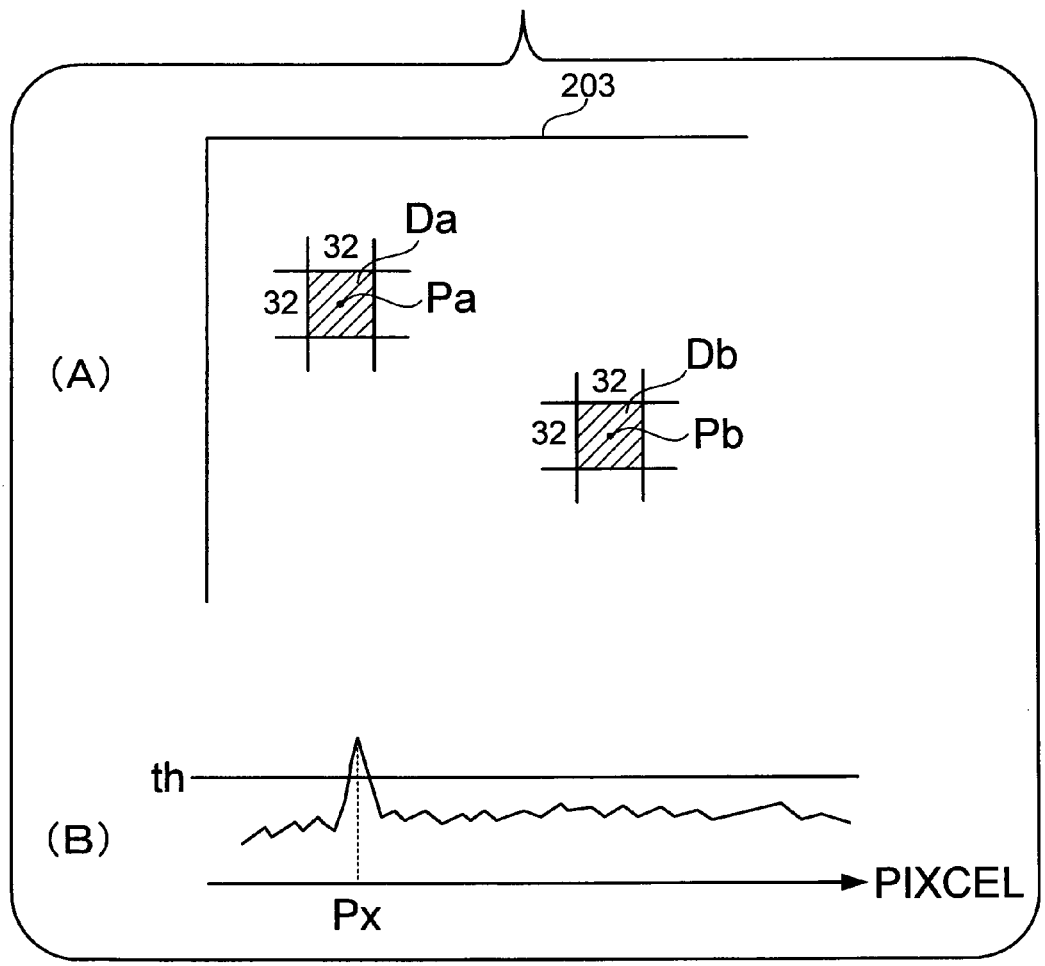
FIG. 18 is a conceptual view showing processing performed by a search pixel extracting section.

FIG. 18 is a conceptual view showing the processing performed by the search pixel extracting section.

Part (A) of FIG. 18 shows one differential image 203. For a pixel Pa, the average value of the pixel values (brightness values) of the 32-by-32 pixels in a region Da including the 32-by-32 pixels around the pixel Pa is obtained, and the average value becomes the new pixel value (brightness value) of the pixel Pa. Similarly, for a pixel Pb, the average value of the pixel values (brightness values) of the 32-by-32 pixels in a region Db including the 32-by-32 pixels around the pixel Pb is obtained, and the average value is allocated as the new pixel value to the pixel Pb. In the averaging processing, the above-described pieces of processing are repeatedly performed to the whole of the differential image 203, and the whole of the differential image 203 is averaged to obtain the averaging differential image.

Part (B) of FIG. 18 is a schematic diagram in which the pixels of the averaging differential image are horizontally arranged while the vertical axis indicates the pixel value (the averaged pixel value) of each pixel.

The pixel value of each pixel in the averaging differential image is compared to a threshold Th, and the pixel having the pixel value that exceeds the threshold Th is extracted as the search pixel.

Figure 19:
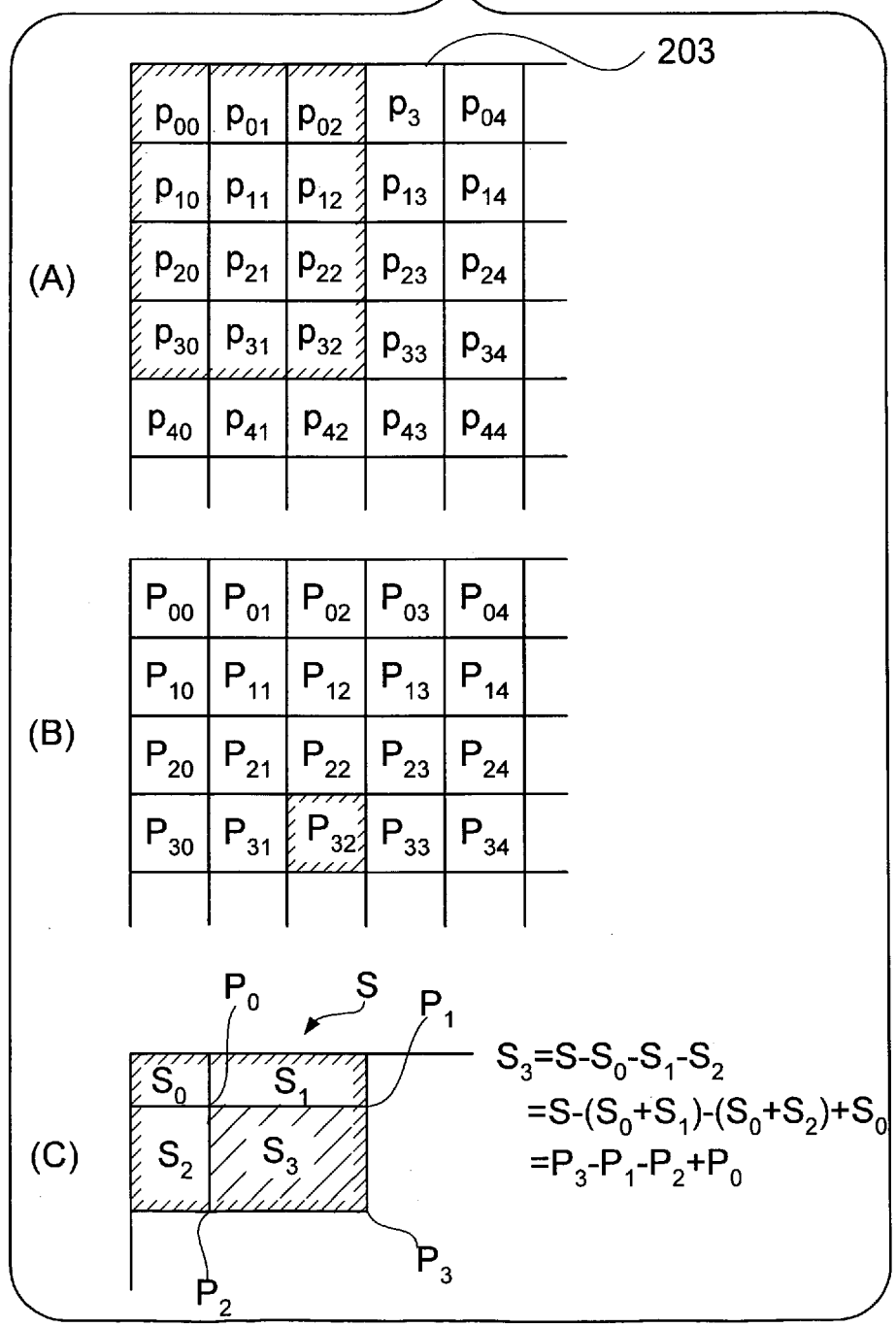
FIG. 19 shows a technique of enhancing an averaging processing speed.

FIG. 19 shows a technique of enhancing a speed of the averaging processing of FIG. 18.

Part (A) of FIG. 19 partially shows an upper right corner of one differential image.

Each measure expresses one pixel, and the numerals $P_{00}$, $P_{01}$, ... in the measures indicates the pixel value (brightness value) of the pixel.

Part (B) of FIG. 19 is a view showing the midstream of the computation. The following computation is performed here.

$$P_{00} = p_{00}$$
$$P_{01} = p_{00} + p_{01}$$
$$P_{02} = p_{00} + p_{01} + p_{02}$$
$$...$$
$$P_{10} = p_{00} + p_{10}$$
$$P_{11} = p_{00} + p_{01} + p_{10} + p_{11}$$
$$P_{12} = p_{00} + p_{01} + P_{02} + p_{10} + p_{11} + p_{12}$$
$$...$$
$$P_{20} = p_{00} + p_{10} + p_{20}$$
$$P_{21} = p_{00} + p_{01} + p_{10} + p_{11} + p_{20} + p_{21}$$
$$P_{22} = p_{00} + p_{11} + p_{02} + p_{10} + p_{11} + p_{12} + p_{20} + p_{21} + p_{22}$$
$$...$$

That is, for example, the pixel value $P_{32}$ of the pixel shown by a hatching frame in part (B) of FIG. 19 becomes the sum of the pixel values of the plural pixels in the region shown by the hatching on the differential image of part (A) of FIG. 19. Thus, the sum of the pixel values of the plural pixels of the region expanded on the left side and upper side including the pixel itself is allocated as the pixel value of the pixel to each pixel.

Part (C) of FIG. 19 is an explanatory view showing the method of obtaining the sum of the pixel values of the pixels in a region $S_3$. The region $S_3$ indicates one region in 32-by-32 pixels of part (A) of FIG. 18. In part (C) of FIG. 19, the region and the sum of the pixel values (brightness values) of the pixels in the region are designated by the same numeral without distinguishing the region and the sum of the pixel values from each other.

Using the pixel values $P_{00}$, $P_{01}$, ... of the pixels computed as shown in part (B) of FIG. 19, the sum $S_3$ of the pixel values (brightness values) of the pixels in the region $S_3$ on the differential image of part (A) of FIG. 19 is expressed as follows:

$$\begin{aligned} S_3 &= S - S_0 - S_1 - S_2 \\ &= S - (S_0 + S_1) - (S_0 + S_2) + S_0 \\ &= P_3 - P_1 - P_2 + P_0 \end{aligned} \quad (5)$$

Where $P_o$, $P_i$, $P_2$, and $P_3$ are pixel values (brightness values) in part (B) of FIG. 19 of the regions $S_o$, $S_i$, $S_2$, and $S_3$.

When the operation described with reference to the part (B) of FIG. 19 is performed only once from the differential image of part (A) of FIG. 19, the average value of the pixel values (brightness values) in the 32-by-32 pixel region on the differential image can easily computed by the simple operation of the equation (5).

The position information on the search pixel, extracted by the search pixel extracting section 120 of FIG. 6, on the differential image is transmitted to the head detecting section 130. The image group of FIG. 17 to which the brightness correction section 112 already performs the brightness correction processing and the image group of the differential images produced by the differential operation section 113 are fed into the head detecting section 130. The head detecting section 130 performs the operation processing under the sequence control of the region extracting operation control section 160.

In the primary evaluated value computing section 131, the many filters acting on the 8-by-8-pixel region are read from the filter storage section 150, and a vector (see equation (2)) expressing the feature quantity is obtained in each region by applying each 8-by-8-pixel filter to the image having the smallest size and the image having the second smallest size in each four images constituting the four-layer image group (including the image group of the differential images produced by the differential operation section 113) shown in FIG. 17 are raster-scanned by the 8-by-8-pixel filters. Then the correspondence relationship (see FIG. 13) between the feature quantity and the primary evaluated value is referred to in each filter, and the feature quantity is converted into the primary evaluated value.

When the primary evaluated value computing section 131 applies the 8-by-8-pixel filter to the smallest image and the second smallest image in the four images constituting the inverted-pyramid-shape four-layer image group, the position information on the differential image of the search pixel extracted by the search pixel extracting section 120 is referred to superimpose the center of the 8-by-8-pixel filter on the pixel corresponding to the search pixel, and the evaluated value of the filter is computed. Specifically, in the search image, the search pixel is extracted through the averaging processing for obtaining the average value of the 32-by-32-pixel sizes with respect to the differential image having the maximum area and the differential image having the second largest area in the image group of the four-layer differential images produced by the differential operation section 113. The search pixel extracted from the differential image having the maximum area is used as an index of the region to which the 8-by-8-pixel filter is applied to the second smallest image, and the search pixel extracted from the differential image having the second largest area is used as an index of the region to which the 8-by-8-pixel filter is applied to the smallest image. That is, the filter acting on the 8-by-8-pixel region is applied to the 8-by-8-pixel region centering on the pixel corresponding to the search pixel extracted from the differential image having the maximum area in the second smallest image, and the filter acting on the 8-by-8-pixel region is applied to the 8-by-8-pixel region centering on the pixel corresponding to the search pixel extracted from the differential image having the second largest area in the smallest image. In the embodiment, because the image has the four-layer structure (see FIG. 17) while the filter has the three-layer structure (see FIG. 10), the filter acting on the smallest 8-by-8-pixel region is applied to the smallest image and the second smallest image, the filter acting on the 16-by-16-pixel region is applied to the second smallest image and the third smallest image (that is, the second largest image), and the filter acting on the 32-by-32-pixel region is applied to the second largest image and the largest image. Therefore, the averaging processing and the search pixel extraction processing are performed to the differential image having the maximum area and differential image having the second largest area to which the filter acting on the largest 32-by-32-pixel region, and the search image is used to narrow the search range with respect to the smallest image and the second smallest image in each image group.

The search pixel information extracted based on the differential image is applied to the series of image groups (see four image groups of FIG. 17) relating to the differential image and the series of image groups (four image groups per each frame) relating to each of the two frame images that are the basis of the production of the differential image. The high-speed processing can also be performed to the still image by applying the search pixel information to the image groups per each frame. Alternatively, as described above, the search pixel information is not applied to the still image, but the whole of smallest image and the whole of the second smallest image in each image group may be searched with the 8-by-8-pixel filter.

The primary evaluated value is obtained by applying the 8-by-8-pixel filter to the region that the primary evaluated value computing section 131 references the search pixel information to narrow. Then the primary evaluated value for each of the plural 8-by-8-pixel filters is fed into the secondary evaluated value computing section 132. The secondary evaluated value computing section 132 obtains the secondary evaluated value by adding many primary evaluated values of the many filters acting the 8-by-8-pixel region to one another, and the region extracting section 133 extracts the primary extraction region where the secondary evaluated value is equal to or larger than the predetermined first threshold (high probability of the appearance of the head).

Then the positional information on the primary extraction region is transmitted to the primary evaluated value computing section 131. In the primary evaluated value computing section 131, the many filters acting on the 16-by-16-pixel region are read from the filter storage section 150, each filter acting on the 16-by-16-pixel region is applied to the region corresponding to the primary extraction region extracted by the region extracting section 133, the feature quantities are computed on the second smallest image and the third smallest image (second largest image) for each of the four inverted-pyramid-shape image groups of FIG. 17, and the feature quantities are converted into the primary evaluated value. In the secondary evaluated value computing section 132, the many primary evaluated values obtained by the many filters acting on the 16-by-16-pixel region are added to one another to obtain the secondary evaluated value. The region extracting section 133 compares the secondary evaluated value and the second threshold to extract the secondary extraction region, in which the probability of the appearance of the head is further enhanced from the region, corresponding to the primary extraction region. The positional information on the secondary extraction region is transmitted to the primary evaluated value computing section 131. In the primary evaluated value computing section 131, the many filters acting on the 32-by-32-pixel region are read from the filter storage section 150, each filter acting on the 32-by-3,2-pixel region is applied to the region corresponding to the secondary extraction region extracted by the region extracting section 133, the feature quantities are extracted on the second largest image and the largest image for each of the four inverted-pyramid-shape image groups of FIG. 17, and the feature quantities are converted into the primary evaluated value. In the secondary evaluated value computing section 132, the many primary evaluated values obtained by the many filters acting on the 32-by-32-pixel region are added to one another to obtain the secondary evaluated value. The region extracting section 133 compares the secondary evaluated value and the third threshold to extract the tertiary extraction region having certainty that the head appears from the region corresponding to the secondary extraction region. The information on the tertiary extraction region, that is, a position pos (coordinate (1,t) at the corner on the upper left of the region) of the region on the image, a coordinate (r,b) in the corner on the lower right, and final secondary evaluated value likeness are fed into the region integrating section 140 of FIG. 6.

Figure 20:
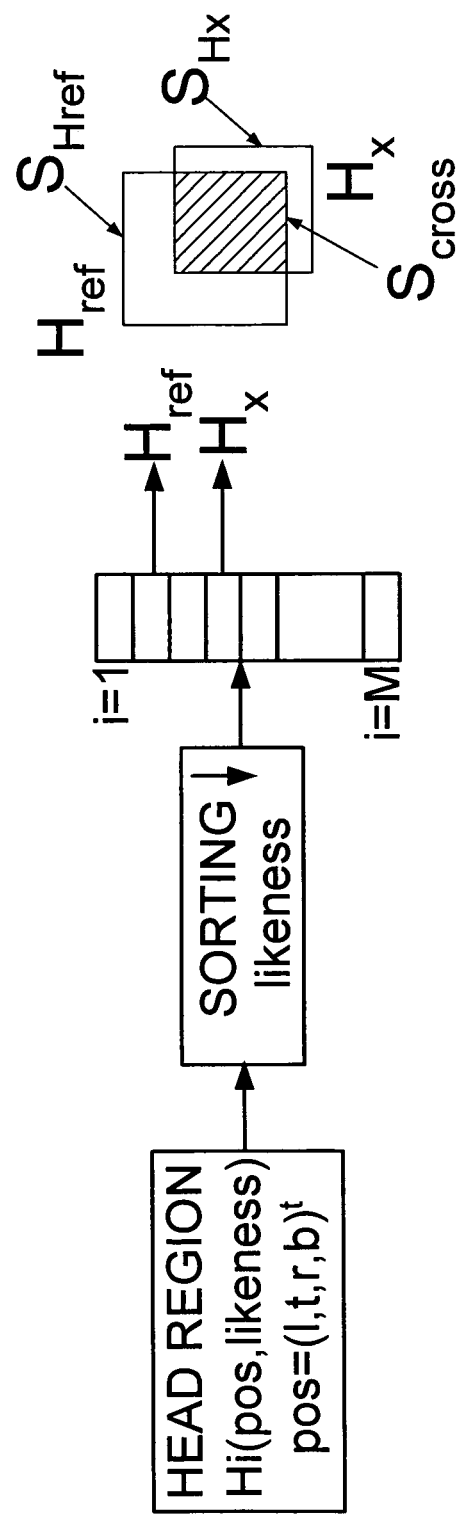
FIG. 20 is an explanatory view showing region integrating processing performed by region integrating section.

FIG. 20 is an explanatory view showing the region integrating processing performed by the region integrating section 140.

When pieces of information $H_i$ (pos, likeness) on the plural head regions (tertiary extraction regions) $H_i$ (i=1, ..., and M) are fed into the region integrating section 140, the region integrating section 140 sorts the pieces of head region information $H_i$ in the order of the secondary evaluated value likeness. At this point, it is assumed that two regions $H_{ref}$ and $H_x$ partially overlap each other, and it is assumed that the region $H_{ref}$ is higher than the region $H_x$ in the secondary evaluated value likeness.

Assuming that $S_{Href}$ is an area of the region $H_{ref}$, $S_{Hx}$ is an area of the region $H_x$, and $S_{cross}$ is an area of the overlapping portion of the regions $H_{ref}$ and $H_x$, an overlapping ratio $\rho$ is computed by the following equation.

$$\rho = \frac{S_{cross}}{S_{Href} + S_{Hx} - S_{cross}} \quad (6)$$

A region integrating operation is performed when the overlapping ratio $\rho$ is equal to or larger than a threshold $\rho$low. That is, the weight is imparted to the corresponding coordinate in the coordinates at the four corners of the region $H_{ref}$ and in the coordinates at the four corners of the region $H_x$ by the likeness of the region, and the regions $H_{ref}$ and $H_x$ are integrated into one region.

For example, coordinates $I_{ref}$ and $I_x$ in the horizontal direction at the upper left corners of the regions $H_{ref}$ and $H_x$ are converted into the integrated coordinate expressed by the following equation (7) using likeness (ref) and likeness (x) that are of the likeness of each of the regions $H_{ref}$ and $H_x$.

$$l = \frac{l_{ref} \times \text{likeness}(ref) + l_x \times \text{likeness}(x)}{\text{likeness}(ref) + \text{likeness}(x)} \quad (7)$$

Using the equation (7), the operation is performed for the four coordinates pos=$(1, t, r, b)^t$, and the two regions $H_{ref}$ and $H_x$ are integrated into the one region.

The same holds true for the case in which at least three regions overlap one another.

In the embodiment, the region where the human head appears is accurately extracted at high speed through the above-described pieces of processing.

In the embodiment, the search pixel extracting section 120 extracts the search pixel by performing the averaging processing to the differential image produced by the differential operation section 113. Alternatively, the image group is received from the brightness correction section 112 or the upper-stage image group generating section 111 before the differential operation, the averaging processing is performed to each of the two frame images before the differential operation the difference is compute to obtain the averaging differential image, and the search pixel may be extracted from the averaging differential image.

In the embodiment, the filter or the image is formed in the layer structure, the processing is performed in the order from the small image or small filter toward the large image or large filter, and the speed enhancement and high accuracy of the head detection are achieved. Further, the invention can also be applied to the conventional single-layer structure instead of the multi-layer structure.

The invention claimed is:

1. An object detecting method that detects a specific kind of object from a continuous image including a plurality of frames each of which is expressed by two-dimensionally arrayed pixels, the object detecting method comprising:

a differential image producing step of producing a differential image between a first frame and a second frame in the plurality of frames constituting the continuous image, the first frame and the second frame being different from each other;

a search pixel extracting step of computing a differential value between new values of pixels corresponding to the first frame and the second frame, of comparing the differential value and a threshold, and of extracting a search pixel on the differential image, when an average value of values of a plurality of pixels in an averaging region having a two-dimensional predetermined size around each pixel for each of the first frame and the second frame is set at a new value of each pixel, the search pixel searching existence of the specific kind of object; and an object detecting step of applying a filter to a search region including the search pixel extracted in the search pixel extracting step on the differential image produced in the differential image producing step, of obtaining an evaluated value with the filter, and of comparing the evaluated value and the threshold to extract a region where the specific kind of object exists, the filter acting on a search region having an area and a shape that are identical to those of the averaging region on the image, the filter obtaining the evaluated value indicating a probability that the specific kind of object exists in the search region, wherein the differential image producing step is a step of producing a differential image between the first frame and the second frame and producing a differential image group from a plurality of differential images by producing at least one differential image between a first thin-out frame and a second thin-out frame, the plurality of differential images having an identical scene and different resolutions, the first thin-out frame and the second thin-out frame having an identical size, the first thin-out frame and the second thin-out frame being formed by thinning out the pixels constituting each frame at a predetermined ratio for each of the first frame and the second frame or by gradually thinning out the pixels at the predetermined ratio, the object detecting step is a step of detecting a specific kind of object from the differential images by sequentially repeating a plurality of extraction processes from an extraction process of applying a filter acting on a relatively narrow search region to a relatively small differential image toward an extraction process of applying a filter acting on a relatively wide search region to a relatively differential large image, the plurality of extraction processes including a first extraction process and a second extraction process, in the first extraction process, a primary candidate region being extracted by applying a first filter to a first differential image that is relatively small in the differential image group produced in the differential image producing step, an evaluated value exceeding a predetermined first threshold being obtained in the primary candidate region, the first filter acting on a relatively narrow search region in a filter group including a plurality of filters acting on a plurality of search regions having a plurality of sizes, the number of pixels corresponding to the size of the region on the image being changed at the predetermined ratio or gradually changed at the predetermined ratio in the plurality of search regions having the plurality of sizes, the plurality of filters acting on the search region that is two-dimensionally extended on the image, the plurality of filters producing an evaluated value indicating a probability that the specific kind of object exists in the search region, in the second extraction process, a secondary candidate region being extracted by applying a second filter to a region corresponding to the primary candidate region in a second differential image in which the number of pixels is larger by one stage than that of the first differential image in the differential image group produced in the differential image producing step, the evaluated value exceeding a predetermined second threshold being obtained in the secondary candidate region, the second filter acting on the search region that is wider by one stage than that of the first filter in the filter group, the search pixel extracting step is a step of employing an averaging region having an area and a shape that are identical to those of a maximum search region to which a maximum region filter acting on the maximum search region in the filter group and of extracting the search pixel from the differential image to which the maximum region filter is applied in the object detecting step in the plurality of differential images constituting the differential image group produced in the differential image producing step, and the object detecting step is a step of extracting the primary candidate region from the search region by applying the first filter to the search region on the first differential image in the first extraction process, the search region including the pixel corresponding to the search pixel extracted in the search pixel extracting step.

2. The object detecting method according to claim 1, wherein the differential image producing step is a step of producing the differential image group and of producing newly at least one differential image group, the at least one differential image group including one interpolated differential image or a plurality of interpolated differential images and at least one thinned-out differential image, the one interpolated differential image being obtained by an interpolation operation, the one interpolated differential image having a range of the number of pixels that is smaller than the number of pixels of the maximum-area differential image constituting the differential image group and larger than the number of pixels of the thinned-out differential image obtained by thinning out the maximum-area differential image at the predetermined ratio, the number of pixels being changed within the range in the plurality of interpolated differential images, the at least one thinned-out differential image being formed by thinning out the pixels constituting interpolated differential image at the predetermined ratio for each of the interpolated differential images or formed by gradually thinning out the pixels at the predetermined ratio, and the object detecting step is a step of detecting the specific kind of object by sequentially repeating the extraction process from the plurality of extraction processes of applying the filter acting on the relatively narrow search region to the relatively small image toward the extraction process of applying the filter acting on the relatively wide search region to the relatively large image to each of the plurality of differential image groups produced in the differential image producing step.

3. The object detecting method according to claim 1, wherein a plurality of kinds of filters is prepared for each search region having one size, each of the plurality of kinds of filters computing an outline of the specific kind of object and one of feature quantities in the specific kind of object, and a correspondence relationship between the feature quantity computed by each filter and the primary evaluated value indicating the probability of the specific kind of object is prepared, and the object detecting step is a step of computing the plurality of feature quantities by applying the plurality of kinds of filters to one search region according to the size of the search region, of obtaining each primary evaluated value corresponding to each feature quantity, of comparing a secondary evaluated value in which the plurality of primary evaluated values is integrated and a threshold, and of determining whether or not the search region is a candidate region where the specific kind of object exists.

4. The object detecting method according to claim 1, further comprising a region integrating step of integrating a plurality of regions into one region according to a degree of overlapping of the plurality of regions when the plurality of regions is detected in the object detecting step.

5. The object detecting method according to claim 1, wherein the filter group includes a plurality of filters that produce an evaluated value indicating a probability of existence of a human head, and the human head emerging in an image is set at a detecting target in the object detecting method.

6. An object detecting apparatus that detects a specific kind of object from a continuous image including a plurality of frames each of which is expressed by two-dimensionally arrayed pixels, the object detecting apparatus comprising:

a differential image producing section that produces a differential image between a first frame and a second frame in the plurality of frames constituting the continuous image, the first frame and the second frame being different from each other;

a search pixel extracting section that computes a differential value between new values of pixels corresponding to the first frame and the second frame, compares the differential value and a threshold, and extracts a search pixel on the differential image, when an average value of values of a plurality of pixels in an averaging region having a two-dimensional predetermined size around each pixel for each of the first frame and the second frame is set at a new value of each pixel, the search pixel searching existence of the specific kind of object;

a filter storage section in which a filter is stored, the filter acting on a search region having an area and a shape that are identical to those of the averaging region on the image, the filter obtaining an evaluated value indicating a probability that the specific kind of object exists in the search region; and an object detecting section that applies a filter stored in the filter storage section to the search region including the search pixel extracted by the search pixel extracting section on the differential image produced by the differential image producing section, obtains the evaluated value with the filter, and compares the evaluated value and the threshold to extract a region where the specific kind of object exists, wherein the differential image producing section produces a differential image between the first frame and the second frame and produces a differential image group from a plurality of differential images by producing at least one differential image between a first thin-out frame and a second thin-out frame, the plurality of differential images having an identical scene and different resolutions, the first thin-out frame and the second thin-out frame having an identical size, the first thin-out frame and the second thin-out frame being formed by thinning out the pixels constituting each frame at a predetermined ratio for each of the first frame and the second frame or by gradually thinning out the pixels at the predetermined ratio, a filter group including a plurality of filters is stored in the filter storage section, the plurality of filters acting on a plurality of search regions having a plurality of sizes, the number of pixels corresponding to the size of the region on the image being changed at the predetermined ratio or gradually changed at the predetermined ratio in the plurality of search regions having the plurality of sizes, the plurality of filters acting on the search region that is two-dimensionally extended on the image, the plurality of filters producing an evaluated value indicating a probability that the specific kind of object exists in the search region, the object detecting section detects the specific kind of object from the differential images by sequentially repeating a plurality of extraction processes from an extraction process of applying a filter acting on a relatively narrow search region to a relatively small differential image toward an extraction process of applying a filter acting on a relatively wide differential region to a relatively large search image, the plurality of extraction processes including a first extraction process and a second extraction process, in the first extraction process, a primary candidate region being extracted by applying a first filter to a first differential image that is relatively small in the differential image group produced in the differential image producing step, an evaluated value exceeding a predetermined first threshold being obtained in the primary candidate region, the first filter acting on a relatively narrow search region in a filter group stored in the filter storage section, in the second extraction process, a secondary candidate region being extracted by applying a second filter to a region corresponding to the primary candidate region in a second differential image in which the number of pixels is larger by one stage than that of the first differential image in the differential image group produced by the differential image producing section, the evaluated value exceeding a predetermined second threshold being obtained in the secondary candidate region, the second filter acting on the search region that is wider by one stage than that of the first filter in the filter group, the search pixel extracting section employs an averaging region having an area and a shape that are identical to those of a maximum search region to which a maximum region filter acting on the maximum search region in the filter group and extracts the search pixel from the differential image to which the maximum region filter is applied by the object detecting section in the plurality of differential images constituting the differential image group produced by the differential image producing section, and the object detecting section extracts the primary candidate region from the search region by applying the first filter to the search region on the first differential image in the first extraction process, the search region including the pixel corresponding to the search pixel extracted by the search pixel extracting section.

7. The object detecting apparatus according to claim 6, wherein the differential image producing section produces the differential image group and newly at least one differential image group, the at least one differential image group including one interpolated differential image or a plurality of interpolated differential images and at least one thinned-out differential image, the one interpolated differential image being obtained by an interpolation operation, the one interpolated differential image having a range of the number of pixels that is smaller than the number of pixels of the maximum-area differential image constituting the differential image group and larger than the number of pixels of the thinned-out differential image obtained by thinning out the maximum-area differential image at the predetermined ratio, the number of pixels being changed within the range in the plurality of interpolated differential images, the at least one thinned-out differential image being formed by thinning out the pixels constituting interpolated differential image at the predetermined ratio for each of the interpolated differential images or formed by gradually thinning out the pixels at the predetermined ratio, and the object detecting section detects the specific kind of object by sequentially repeating the plurality of extraction processes from the extraction process of applying the filter acting on the relatively search narrow region to the relatively small image toward the extraction process of applying the filter acting on the relatively wide search region to the relatively large image to each of the plurality of differential image groups produced by the differential image producing section.

8. The object detecting apparatus according to claim 6, wherein a plurality of kinds of filters for each search region having one size is stored in the filter storage section, each of the plurality of kinds of filters detecting an outline of the specific kind of object and one of feature quantities in the specific kind of object, and a correspondence relationship between the feature quantity computed by each filter and the primary evaluated value indicating a probability of the specific kind of object is stored in the filter storage section, and the object detecting section computes the plurality of feature quantities by applying the plurality of kinds of filters to one search region according to the size of the search region, obtains each primary evaluated value corresponding to each feature quantity, compares a secondary evaluated value in which the plurality of primary evaluated values is integrated and a threshold, and determines whether or not the search region is a candidate region where the specific kind of object exists.

9. The object detecting apparatus according to claim 6, further comprising a region integrating section that integrates a plurality of regions into one region according to a degree of overlapping of the plurality of regions when the plurality of regions is detected by the object detecting section.

10. The object detecting apparatus according to claim 6, wherein the filter group including a plurality of filters that produces an evaluated value indicating a probability of existence of a human head is stored in the filter storage section, and the object detecting apparatus sets the human head emerging in an image at a detecting target.

11. A non-transitory computer-readable storage medium storing an object detecting program that is executed in an operation device, the object detecting program causing the operation device to be operated as a object detecting apparatus that detects a specific kind of object from a continuous image including a plurality of frames each of which is expressed by two-dimensionally arrayed pixels, the object detecting apparatus comprising:

a differential image producing section that produces a differential image between a first frame and a second frame in the plurality of frames constituting the continuous image, the first frame and the second frame being different from each other;

a search pixel extracting section that computes a differential value between new values of pixels corresponding to the first frame and the second frame, compares the differential value and a threshold, and extracts a search pixel on the differential image, when an average value of values of a plurality of pixels in an averaging region having a two-dimensional predetermined size around each pixel for each of the first frame and the second frame is set at a new value of each pixel, the search pixel searching existence of the specific kind of object;

a filter storage section in which a filter is stored, the filter acting on a search region having an area and a shape that are identical to those of the averaging region on the image, the filter obtaining an evaluated value indicating a probability that the specific kind of object exists in the search region; and an object detecting section that applies a filter stored in the filter storage section to the search region including the search pixel extracted by the search pixel extracting section on the differential image produced by the differential image producing section, obtains the evaluated value with the filter, and compares the evaluated value and the threshold to extract a region where the specific kind of object exists, wherein the differential image producing section produces a differential image between the first frame and the second frame and produces a differential image group from a plurality of differential images by producing at least one differential image between a first thin-out frame and a second thin-out frame, the plurality of differential images having an identical scene and different resolutions, the first thin-out frame and the second thin-out frame having an identical size, the first thin-out frame and the second thin-out frame being formed by thinning out the pixels constituting each frame at a predetermined ratio for each of the first frame and the second frame or by gradually thinning out the pixels at the predetermined ratio, a filter group including a plurality of filters is stored in the filter storage section, the plurality of filters acting on a plurality of search regions having a plurality of sizes, the number of pixels corresponding to the size of the region on the image being changed at the predetermined ratio or gradually changed at the predetermined ratio in the plurality of search regions having the plurality of sizes, the plurality of filters acting on the search region that is two-dimensionally extended on the image, the plurality of filters producing an evaluated value indicating a probability that the specific kind of object exists in the search region, the object detecting section detects the specific kind of object from the differential images by sequentially repeating a plurality of extraction processes from an extraction process of applying a filter acting on a relatively narrow search region to a relatively small differential image toward an extraction process of applying a filter acting on a relatively wide search region to a relatively large differential image, the plurality of extraction processes including a first extraction process and a second extraction process, in the first extraction process, a primary candidate region being extracted by applying a first filter to a first differential image that is relatively small in the differential image group produced in the differential image producing step, an evaluated value exceeding a predetermined first threshold being obtained in the primary candidate region, the first filter acting on a relatively narrow search region in a filter group stored in the filter storage section, in the second extraction process, a secondary candidate region being extracted by applying a second filter to a region corresponding to the primary candidate region in a second differential image in which the number of pixels is larger by one stage than that of the first differential image in the differential image group produced by the differential image producing section, the evaluated value exceeding a predetermined second threshold being obtained in the secondary candidate region, the second filter acting on the search region that is wider by one stage than that of the first filter in the filter group, the search pixel extracting section employs an averaging region having an area and a shape that are identical to those of a maximum search region to which a maximum region filter acting on the maximum search region in the filter group and extracts the search pixel from the differential image to which the maximum region filter is applied by the object detecting section in the plurality of differential images constituting the differential image group produced by the differential image producing section, and the object detecting section extracts the primary candidate region from the search region by applying the first filter to the search region on the first differential image in the first extraction process, the search region including the pixel corresponding to the search pixel extracted by the search pixel extracting section.

12. The non-transitory computer-readable storage medium according to claim 11, wherein the differential image producing section produces the differential image group and newly at least one differential image group, the at least one differential image group including one interpolated differential image or a plurality of interpolated differential images and at least one thinned-out differential image, the one interpolated differential image being obtained by an interpolation operation, the one interpolated differential image having a range of the number of pixels that is smaller than the number of pixels of the maximum-area differential image constituting the differential image group and larger than the number of pixels of the thinned-out differential image obtained by thinning out the maximum-area differential image at the predetermined ratio, the number of pixels being changed within the range in the plurality of interpolated differential images, the at least one thinned-out differential image being formed by thinning out the pixels constituting interpolated differential image at the predetermined ratio for each of the interpolated differential images or formed by gradually thinning out the pixels at the predetermined ratio, and the object detecting section detects the specific kind of object by sequentially repeating the extraction process from the plurality of extraction processes of applying the filter acting on the relatively narrow search region to the relatively small image toward the extraction process of applying the filter acting on the relatively wide search region to the relatively large image to each of the plurality of differential image groups produced by the differential image producing section.

13. The non-transitory computer-readable storage medium according to claim 11, wherein a plurality of kinds of filters for each search region having one size is stored in the filter storage section, each of the plurality of kinds of filters detecting an outline of feature quantities of and one of feature quantities in the specific kind of object, and a correspondence relationship between the feature quantity computed by each filter and the primary evaluated value indicating a probability of the specific kind of object is stored in the filter storage section, and the object detecting section computes the plurality of feature quantities by applying the plurality of kinds of filters to one search region according to the size of the search region, obtains each primary evaluated value corresponding to each feature quantity, compares a secondary evaluated value in which the plurality of primary evaluated values is integrated and a threshold, and determines whether or not the search region is a candidate region where the specific kind of object exists.

14. The non-transitory computer-readable storage medium according to claim 11, wherein the operation device is operated as the object detecting apparatus further including a region integrating section that integrates a plurality of regions into one region according to a degree of overlapping of the plurality of regions when the plurality of regions is detected by the object detecting section.

15. The non-transitory computer-readable storage medium according to claim 11, wherein the filter group including a plurality of filters that produce an evaluated value indicating a probability of existence of a human head is stored in the filter storage section, and the object detecting program causes the operation device to be operated as the object detecting apparatus that sets the human head emerging in an image at a detecting target.

* * * * *